US011348218B2

(12) United States Patent
Guner et al.

(10) Patent No.: US 11,348,218 B2
(45) Date of Patent: May 31, 2022

(54) HYBRID INTERPRETATION APPROACH FOR BOREHOLE IMAGING

(71) Applicant: Halliburton Energy Services, Inc., Houston, TX (US)

(72) Inventors: Baris Guner, Houston, TX (US); Ahmed Elsayed Fouda, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 297 days.

(21) Appl. No.: 16/835,115

(22) Filed: Mar. 30, 2020

(65) Prior Publication Data

US 2021/0304386 A1    Sep. 30, 2021

(51) Int. Cl.
*G06T 7/00* (2017.01)
*G01V 8/02* (2006.01)
(Continued)

(52) U.S. Cl.
CPC .............. *G06T 7/0002* (2013.01); *G01V 8/02* (2013.01); *G06N 20/00* (2019.01); *G06T 1/0014* (2013.01);
(Continued)

(58) Field of Classification Search
CPC .. G06T 13/02; G06T 5/00; G06T 7/17; H04N 5/22; G06V 10/06
See application file for complete search history.

(56) References Cited

U.S. PATENT DOCUMENTS 3,060,373 A    10/1962    Doll
3,132,298 A    5/1964    Doll et al.
(Continued)

FOREIGN PATENT DOCUMENTS

CA         685727         5/1964
WO      2017-188858      11/2017
(Continued)

OTHER PUBLICATIONS

SPWLA 61st Annual Logging Symposium, Guner, et al., Quantitative Demonstration of a High-Fidelity Oil-Based Mud Resistivity Imager using a Controlled Experiment, Jun. 24 to Jul. 29, 2020.
(Continued)

*Primary Examiner* — Yosef Kassa
(74) *Attorney, Agent, or Firm* — John Wustenberg; C. Tumey Law Group PLLC

(57) ABSTRACT

A method for identifying one or more imaging properties. The method may comprise identifying one or more candidate mud constants, taking one or more measurements from a borehole with a downhole tool to form an image log, inputting into a machine learning model one or more inputs such that the machine learning model outputs one or more estimated imaging properties, and inputting into a forward model at least the one or more estimated imaging properties and the one or more candidate mud constants such that the forward model outputs one or more reconstructed tool responses. The method may further comprise computing a misfit between the one or more reconstructed tool responses and the one or more measurements, picking a mud candidate from the one or more candidate mud constants based at least in part on the misfit, and producing one or more imaging properties from the picked mud candidate.

25 Claims, 8 Drawing Sheets

(51) Int. Cl.
*G06T 1/00* (2006.01)
*G06N 20/00* (2019.01)
(52) U.S. Cl.
CPC ............ *G06T 2207/20081* (2013.01); *G06T 2207/20084* (2013.01); *G06T 2207/30181* (2013.01)

(56) References Cited

U.S. PATENT DOCUMENTS

| | | | |
|---|---|---|---|
| 3,379,963 A | | 4/1968 | Saurenman |
| 3,379,964 A | | 4/1968 | Segesman |
| 3,579,098 A | | 5/1971 | Mougne |
| 4,251,773 A | | 2/1981 | Cailliau et al. |
| 4,468,623 A | | 8/1984 | Gianzero et al. |
| 4,545,242 A | | 10/1985 | Chan |
| 4,567,759 A | | 2/1986 | Ekstrom et al. |
| 4,692,908 A | | 9/1987 | Ekstrom et al. |
| 4,851,781 A | | 7/1989 | Marzetta et al. |
| 4,862,090 A | | 8/1989 | Vannier et al. |
| 5,008,625 A | | 4/1991 | Chen |
| 5,012,193 A | | 4/1991 | Chen |
| 5,038,378 A | | 8/1991 | Chen |
| 6,084,826 A | * | 7/2000 | Leggett, III ............ E21B 44/00 181/102 |
| 6,191,588 B1 | | 2/2001 | Chen |
| 6,368,068 B1 | * | 4/2002 | Corlew ................ E21B 47/008 96/214 |
| 6,549,854 B1 | | 4/2003 | Malinvemo et al. |
| RE42,493 E | | 6/2011 | Tabarovsky et al. |
| 8,095,345 B2 | | 1/2012 | Hoversten |
| 8,256,534 B2 | * | 9/2012 | Byreddy ................ E21B 44/00 175/45 |
| 8,579,037 B2 | | 11/2013 | Jacob |
| 8,660,796 B2 | * | 2/2014 | Jacobson ............... G01V 5/101 702/8 |
| 8,811,118 B2 | * | 8/2014 | Reckmann ............. E21B 47/18 340/854.3 |
| 8,898,045 B2 | * | 11/2014 | Chen ...................... G01V 5/125 703/10 |
| 9,678,239 B2 | | 6/2017 | Habashy et al. |
| 2008/0281667 A1 | | 11/2008 | Chen et al. |
| 2011/0106514 A1 | | 5/2011 | Omeragic et al. |
| 2015/0300158 A1 | | 10/2015 | San Martin et al. |
| 2015/0301215 A1 | | 10/2015 | San Martin et al. |
| 2015/0309201 A1 | | 10/2015 | Wu et al. |
| 2015/0369951 A1 | | 12/2015 | San Martin et al. |
| 2016/0003973 A1 | | 1/2016 | Guner et al. |
| 2016/0216397 A1 | | 7/2016 | Donderici et al. |
| 2016/0298444 A1 | | 10/2016 | Donderici et al. |
| 2016/0369626 A1 | | 12/2016 | Donderici et al. |
| 2017/0248728 A1 | | 8/2017 | Fouda et al. |
| 2017/0248730 A1 | | 8/2017 | San Martin et al. |
| 2017/0269253 A1 | | 9/2017 | Fouda et al. |
| 2018/0016888 A1 | | 1/2018 | San Martin et al. |
| 2018/0106141 A1 | | 4/2018 | Fouda et al. |
| 2018/0106763 A1 | | 4/2018 | Fouda et al. |
| 2018/0106764 A1 | | 4/2018 | Fouda et al. |
| 2018/0258755 A1 | | 9/2018 | Donderici et al. |
| 2019/0003815 A1 | | 1/2019 | San Martin et al. |
| 2019/0078430 A1 | | 3/2019 | Fouda et al. |
| 2019/0086320 A1 | | 3/2019 | Guner et al. |
| 2019/0088988 A1 | | 3/2019 | Hayner et al. |
| 2019/0113650 A1 | | 4/2019 | Guner et al. |
| 2019/0190532 A1 | | 6/2019 | Gupta |
| 2019/0203580 A1 | | 7/2019 | Guner et al. |
| 2019/0218904 A1 | | 7/2019 | Fouda et al. |
| 2019/0277995 A1 | | 9/2019 | Fouda et al. |
| 2019/0339230 A1 | | 11/2019 | Khalaj Amineh et al. |
| 2019/0369285 A1 | | 12/2019 | Fouda et al. |
| 2020/0041683 A1 | | 2/2020 | Donderici et al. |
| 2020/0073004 A1 | | 3/2020 | Fouda et al. |
| 2021/0055449 A1 | | 2/2021 | Guner et al. |

FOREIGN PATENT DOCUMENTS

| | | |
|---|---|---|
| WO | 2018201114 | 11/2018 |
| WO | 2019177588 | 9/2019 |

OTHER PUBLICATIONS

Chen, et al. A Novel Array Laterolog Method, Oct. 1998.
SPWLA 38th Annual Logging Symposium, Vigne, et al., Strange Invasion Profiles: What Multiarray Induction Logs can tell us about how Oil-Based Mud affects the invasion process and wellbore stability, Jun. 1997.
SPE22726, Safinya, et al., Improved Formation Imaging with Extended Microelectrical Arrays, 1991.
SPE30584, Smits, et al., High Resolution from a New Laterolog with Azimuthal Imaging, 1995.
SPE Formation Evaluation, Davies, et al., Azimuthal Resistivity Imaging: A New-Generation Laterolog, Sep. 1994.
SPE401, Suau, et al., The Dual Laterolog-R Tool, Jul. 1973.
Y.H. Chen et al., Inversion-Based Workflow for Quantitative Interpretation of the New-Generation Oil-Based Mud Resistivity Imager, SPWLA 55th Annual Logging Symposium, May 2014.
Bloemenkamp et al., Design and Field Testing of a New High-definition Microresistivity Imaging Tool Engineered for oil-based mud, SPWLA 55th Annual Logging Symposium, May 2014.
Bayraktar et al., "Quantitative Interpretation of Oil-base Mud Microresistivity Imager Via Artificial Neural Networks," SPWLA 60th Annual Logging Symposium, Jun. 2019.
Weigend, On Overfitting and the Effective Number of Hidden Units; CU-CS-674-93, 1993.
Schlumberger, QuantaGeo, rPhotorealistic Reservoir Geology Service, 2014.
U.S. Appl. No. 16/579,513.
International Search Report and Written Opinion, Application No. PCT/US2020/026928, dated Dec. 21, 2020.

* cited by examiner

HYBRID INTERPRETATION APPROACH FOR BOREHOLE IMAGING

BACKGROUND

Boreholes drilled into subterranean formations may enable recovery of desirable fluids (e.g., hydrocarbons) using a number of different techniques. A downhole tool may be employed in subterranean operations to determine borehole and/or formation properties.

Traditionally, borehole imager tools may be used in obtaining a detailed characterization of reservoirs. These borehole imager tools may provide a resistivity image of the formation immediately surrounding the borehole. Borehole imager tools may be used to determine formation stratigraphy, dips of the formation layers as well as, borehole and formation stress. During drilling operations borehole imager tools may be particularly important in learning about thin beds, fracture locations, and low resistivity formations. To detect thin beds, fracture locations, and low resistivity formations borehole imager may transmit a current through an injector electrode into the formation. A return electrode may record the current after the current has passed through the formation. Measuring this current may allow an operator to determine characteristic and properties of thin beds, fracture locations, and low resistivity formations.

Oil based mud imagers exhibit complex responses. Impedance measurements of oil based mud imagers are not only a function of the formation resistivity but formation permittivity, mud resistivity, mud permittivity, borehole shape, standoff and tool geometry as well. Thus, raw apparent resistivity images from these tools may not depict the formation resistivity accurately. Applying a traditional inversion method is one way to accomplish higher accuracy, however, this approach is computationally costly.

BRIEF DESCRIPTION OF THE DRAWINGS

For a detailed description of the examples of the disclosure, reference will now be made to the accompanying drawings in which.

DETAILED DESCRIPTION

The present disclosure discloses a system and method for optimization of downhole tool performance through a combination of algorithms, machine learning, and inversion based techniques are discussed. As discussed below, methods may vary mud parameters using machine learning approach. Then, using the determined mud properties, full set of formation parameters and standoff may be inverted. Additionally, methods may use an inversion to solve for mud parameters. Then, formation parameters and standoff may be determined using a machine learning model optimized for the inverted mud properties. The combination of machine learning and inversion techniques improves speed compared to inversion based approaches while maintaining a higher level of accuracy in comparison with machine learning approaches. If machine learning based approaches are used to determine mud properties, preliminary results for formation parameters and standoff may be obtained in near real-time as well.

Figure 1:
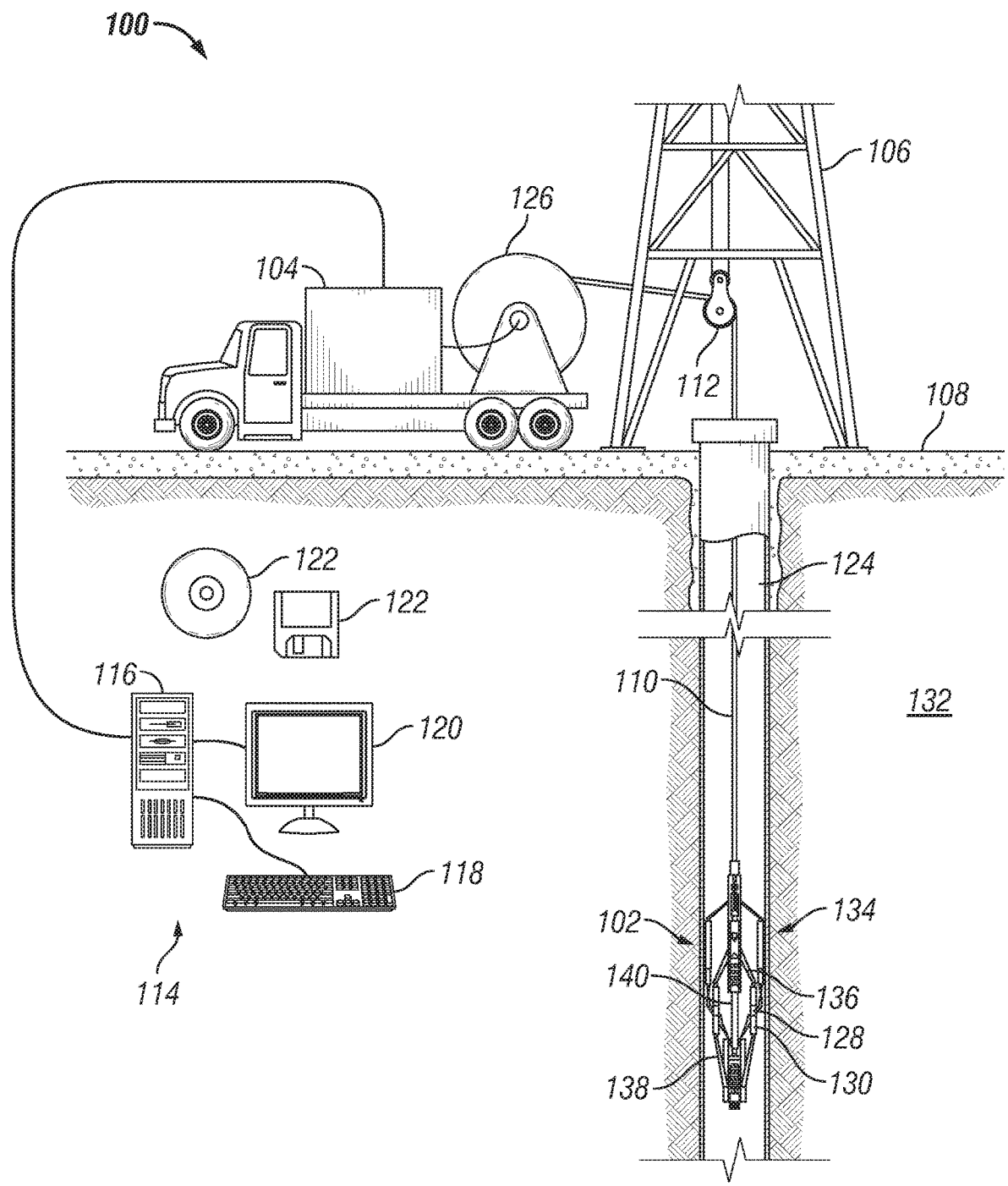
FIG. 1 illustrate an example of a well measurement system.

FIG. 1 illustrates a cross-sectional view of an example of a well measurement system 100. As illustrated, well measurement system 100 may include downhole tool 102 attached to a vehicle 104. In examples, it should be noted that downhole tool 102 may not be attached to a vehicle 104. Downhole tool 102 may be supported by rig 106 at surface 108. Downhole tool 102 may be tethered to vehicle 104 through conveyance 110. Conveyance 110 may be disposed around one or more sheave wheels 112 to vehicle 104. Conveyance 110 may include any suitable means for providing mechanical conveyance for downhole tool 102, including, but not limited to, wireline, slickline, coiled tubing, pipe, drill pipe, drill string, downhole tractor, or the like. In some examples, conveyance 110 may provide mechanical suspension, as well as electrical connectivity, for downhole tool 102.

Conveyance 110 may include, in some instances, a plurality of electrical conductors extending from vehicle 104. Conveyance 110 may include an inner core of seven electrical conductors covered by an insulating wrap. An inner and outer steel armor sheath may be wrapped in a helix in opposite directions around the conductors. The electrical conductors may be used for communicating power and telemetry between vehicle 104 and downhole tool 102.

Conveyance 110 may lower downhole tool 102 in borehole 124. Generally, borehole 124 may include horizontal, vertical, slanted, curved, and other types of borehole geometries and orientations. Imaging tools may be used in uncased sections of the borehole. Measurements may be made by downhole tool 102 in cased sections for purposes such as calibration.

As illustrated, borehole 124 may extend through formation 132. As illustrated in FIG. 1, borehole 124 may extend generally vertically into the formation 132, however borehole 124 may extend at an angle through formation 132, such as horizontal and slanted boreholes. For example, although FIG. 1 illustrates a vertical or low inclination angle well, high inclination angle or horizontal placement of the well and equipment may be possible. It should further be noted that while FIG. 1 generally depicts a land-based operation, those skilled in the art may recognize that the principles described herein are equally applicable to subsea operations that employ floating or sea-based platforms and rigs, without departing from the scope of the disclosure.

Information from downhole tool 102 may be gathered and/or processed by information handling system 114. For example, signals recorded by downhole tool 102 may be stored on memory and then processed by downhole tool 102. The processing may be performed real-time during data acquisition or after recovery of downhole tool 102. Processing may alternatively occur downhole or may occur both downhole and at surface. In some examples, signals recorded by downhole tool 102 may be conducted to information handling system 114 by way of conveyance 110. Information handling system 114 may process the signals, and the information contained therein may be displayed for an operator to observe and stored for future processing and reference. Information handling system 114 may also contain an apparatus for supplying control signals and power to downhole tool 102.

Systems and methods of the present disclosure may be implemented, at least in part, with information handling system 114. While shown at surface 108, information handling system 114 may also be located at another location, such as remote from borehole 124. Information handling system 114 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 114 may be a processing unit 116, a network storage device, or any other suitable device and may vary in size, shape, performance, functionality, and price. Information handling system 114 may include random access memory (RAM), one or more processing resources such as a central processing unit (CPU) or hardware or software control logic, ROM, and/or other types of nonvolatile memory. Additional components of the information handling system 114 may include one or more disk drives, one or more network ports for communication with external devices as well as an input device 118 (e.g., keyboard, mouse, etc.) and video display 120. Information handling system 114 may also include one or more buses operable to transmit communications between the various hardware components.

Alternatively, systems and methods of the present disclosure may be implemented, at least in part, with non-transitory computer-readable media 122. Non-transitory computer-readable media 122 may include any instrumentality or aggregation of instrumentalities that may retain data and/or instructions for a period of time. Non-transitory computer-readable media 122 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

As discussed below, methods may utilize an information handling system 114 to determine and display a high-resolution resistivity image of formation 132 immediately surrounding borehole 124. This high-resolution resistivity image may depict boundaries of subsurface structures, such as a plurality of layers disposed in formation 132. These formation images may be used in reservoir characterization. Formation images with high resolution may allow accurate identification of thin beds and other fine features such as fractures, clasts and vugs. These formation images may provide information about the sedimentology, lithology, porosity and permeability of formation 132. The formation images may complement, or in some cases replace, the process of coring.

Downhole tool 102 may include a plurality of electrodes, such as button array 128.

Downhole tool 102 may also include a return electrode 130. It should be noted that the plurality of electrodes disposed on button array 128 may be any suitable electrode and is should be further noted that return electrode 130 may be any suitable electrode. Button array 128 and/or return electrode 130 may be disposed on at least one pad 134 in any suitable order. For example, a pad 134 may include only button arrays 128 and/or return electrodes 130. Further, a pad 134 may include both button array 128 and return electrodes 130. Pads 134 may attach to a mandrel 140 of downhole tool 102 through upper arm 136 and lower arm 138. It should be noted that mandrel 140 may be defined as the supporting structure of downhole tool 102 which may act as a platform for any peripheral (e.g., upper arm 136, lower arm 138, conveyance 110, etc.) to attach to downhole tool 102. Upper arm 136 and lower arm 138 may extend pad 134 away from downhole tool 102.

In examples, both upper arm 136 and lower arm 138 may place pad 134 in contact with borehole 124. It should be noted that there may be any suitable number of arms and/or extensions that may be used to move pad 134 away from downhole tool 102 and in close proximity with borehole 124, or vice versa.

During operations, an operator may energize an individual electrode, or any number of electrodes, of button array 128. A voltage may be applied between the electrode of button array 128 and return electrode 130. The level of the voltage may be controlled by information handling system 114. This may cause currents to be transmitted through the electrode of button array 128. It should be noted that there may be any number of currents transmitted into formation 132. These currents may travel through the mud disposed in borehole 124 and formation 132 and may reach back to return electrode 130. The amount of current emitted by each electrode may be inversely proportional to the impedance seen by the electrode. This impedance may be affected by the properties of formation 132 and the mud directly in front of each electrode of button array 128. Therefore, current emitted by each electrode may be measured and recorded in order to obtain a formation image of the resistivity of formation 132.

To produce a resistivity image of formation 132, a current may be emitted from at least one electrode from button array 128 and return to return electrode 130. In examples, current may be emitted from any transmission type electrode along downhole tool 102. These two electrodes may be referred to as the current electrodes. Then, the voltage drop across a pair of the electrodes of button array 128 may be measured and used to estimate the impedance of formation 132. In these alternative implementations, button electrodes may be referred to as voltage electrodes or monitor electrodes. Proposed method may operate in any of the two designs above or any other similar oil-based mud resistivity imager tool without any limitations.

In examples, downhole tool 102 may operate with additional equipment (not illustrated) on surface 108 and/or disposed in a separate well measurement system (not illustrated) to record measurements and/or values from formation 132 to render a resistivity image of formation 132. Without limitation, downhole tool 102 may be connected to and/or controlled by information handling system 114, which may be disposed on surface 108. Without limitation, information handling system 114 may be disposed down hole in downhole tool 102. Processing of information recorded may occur down hole and/or on surface 108. In addition to, or in place of processing at surface 108, processing may occur downhole. Processing occurring downhole may be transmitted to surface 108 to be recorded, observed, and/or further analyzed. Additionally, information recorded on information handling system 114 that may be disposed down hole may be stored until downhole tool 102 may be brought to surface 108. In examples, information handling system 114 may communicate with downhole tool 102 through a fiber optic cable (not illustrated) disposed in (or on) conveyance 110. In examples, wireless communication may be used to transmit information back and forth between information handling system 114 and downhole tool 102. Information handling system 114 may transmit information to downhole tool 102 and may receive as well as process information recorded by downhole tool 102. In examples, a downhole information handling system (not illustrated) may include, without limitation, a microprocessor or other suitable circuitry, for estimating, receiving and processing signals from downhole tool 102. Downhole information handling system (not illustrated) may further include additional components, such as memory, input/output devices, interfaces, and the like. In examples, while not illustrated, downhole tool 102 may include one or more additional components, such as analog-to-digital converter, filter and amplifier, among others, that may be used to process the measurements of downhole tool 102 before they may be transmitted to surface 108. Alternatively, raw measurements from downhole tool 102 may be transmitted to surface 108.

Any suitable technique may be used for transmitting signals from downhole tool 102 to surface 108. As illustrated, a communication link (which may be wired or wireless and may be disposed in conveyance 110, for example) may be provided that may transmit data from downhole tool 102 to an information handling system 114 at surface 108.

Figure 2:
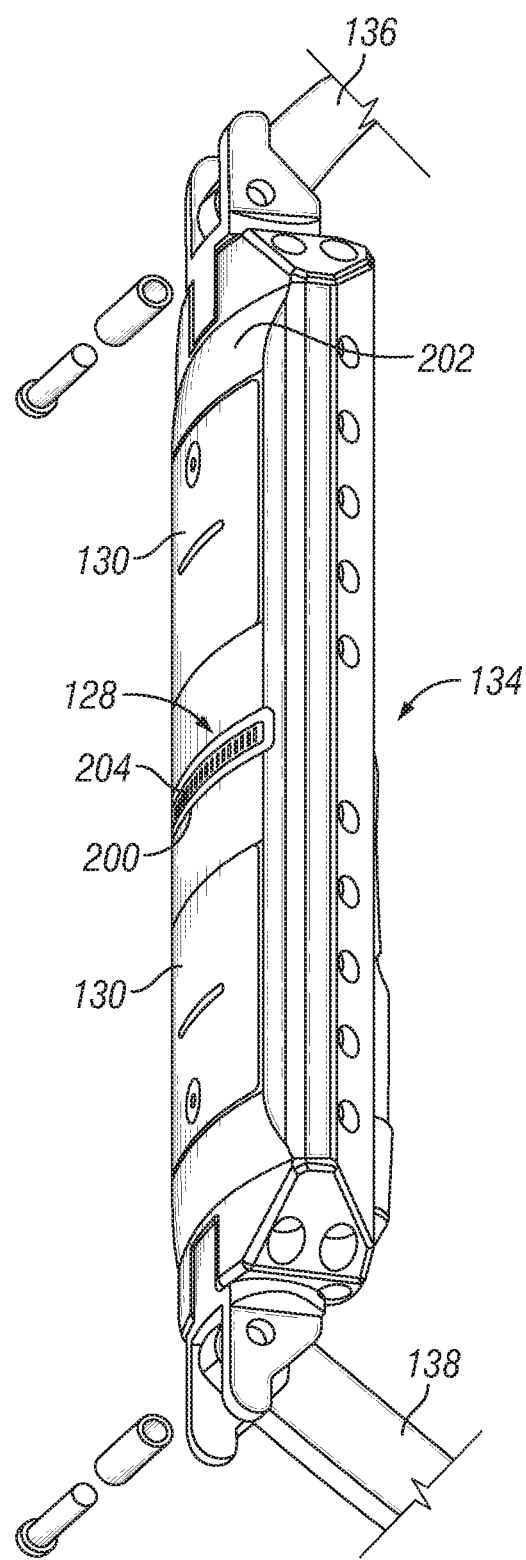
FIG. 2 illustrates an example of a pad.

FIG. 2 illustrates an example of pad 134. It should be noted that pad 134 may be connected to downhole tool 102 (e.g., referring to FIGS. 1 and 2). Pad 134 may serve to place button array 128 and/or return electrode 130 in contact with or in close proximity to borehole 124. Pad 134 may include a button array 128, a return electrode 130, a guard 200, and a housing 202. In examples, there may be a plurality of button arrays 128. In examples, return electrode 130 and button array 128 may be disposed directly on downhole tool 102. Button array 128 may include an injector electrode 204, wherein injector electrode 204 may be a sensor that senses impedance of formation 132. It should be noted that injector electrode 204 may be a button electrode. There may be any suitable number of injector electrodes 204 within button array 128 that may produce a desired, predetermined current. Without limitation, the range for a suitable number of injector electrodes 204 within button array 128 may be from about one injector electrode 204 to about one hundred injector electrodes 204. For example, the range for a suitable number of injector electrodes 204 within button array 128 may be from about one injector electrode 204 to about twenty-five injector electrodes 204, from about twenty-five injector electrodes 204 to about fifty injector electrodes 204, from about fifty injector electrodes 204 to about seventy-five injector electrodes 204, or from about seventy-five injector electrodes 204 to about one hundred injector electrodes 204.

In examples, there may be a plurality of return electrodes 130. One of the return electrodes 130 may be disposed on one side of button array 128, and another one of the return electrodes 130 may be disposed on the opposite side of button array 128. These return electrodes 130 may be disposed at equal distances away from button array 128 or at varying distances from button array 128. Without limitation, the distance from the center of one of the return electrodes to the button array may be from about one inch to about one foot. In examples, a voltage difference between button array 128 and return electrodes 130 may be applied, which may cause currents to be emitted from button array 128 into the mud (not illustrated) and formation 132 (referring to FIG. 1).

During operations, an operator may energize button array 128. A voltage may be applied between each injector electrode 204 and return electrode 130. The level of the voltage may be controlled by information handling system 114. This may cause currents to be transmitted through button array 128. These currents may travel through the mud and formation 132 and may reach back to return electrode 130. The amount of current emitted by each injector electrode 204 may be inversely proportional to the impedance seen by that injector electrode 204. This impedance may be affected by the properties of formation 132 and the mud directly in front of each injector electrode 204. Therefore, current emitted by each injector electrode 204 may be measured and recorded in order to obtain an image of the resistivity of formation 132.

In examples, a current may be transmitted from injector electrode 204 and return to return electrode 130. These two electrodes may be referred to as the current electrodes. Then, the voltage drops across button array 128 may be measured and used to estimate the impedance of formation 132. In these alternative implementations, electrodes of button array 128 may be referred to as voltage electrodes or monitor electrodes. Proposed method may operate in any of the two designs above or any other similar oil-based mud resistivity imager tool without any limitations. In the rest of the text, the imager tool will be assumed to be of the first design without any loss of generality. In examples, generally water based mud imagers do not require capacitive contact with formation 132 (e.g., referring to FIG. 1) because the resistivity of water based muds is lower than oil based muds. This allows water based mud imager tools to operate at lower frequencies the oil based mud imager tools. Likewise, interpretation of images obtained with a water based mud imager is simpler as mud properties and formation permittivity have negligible effect on measurements, in which case the disclosed processing methods may not be needed. However, there may be applications where the disclosed techniques may be applied to the water based mud imager tools; for example, to further increase the accuracy of the image or in a case where an imager tool designed for oil based muds is operated in a water based mud. Thus, although the disclosed techniques are contemplated to be primarily applicable to oil based mud imager tools, the scope of the disclosure is not limited to just oil based muds.

Returning back to FIG. 2, guard 200 may help to focus most of the current produced by button array 128 into formation 132 radially. Guard 200 may be disposed around button array 128. Guard 200 may include the same potential as button array 128.

In examples, housing 202 may serve to protect button array 128 and return electrodes 130 from the surrounding mud and formation 132. Housing may be made with any suitable material. Without limitation, suitable material may include metals, nonmetals, plastics, ceramics, composites and/or combinations thereof. In examples, housing 202 may be a metal plate. Housing 202 may be connected through upper arm 136 to downhole tool 102 (e.g., referring to FIG. 1). An insulating material may be used to fill the remaining portions of pad 134. In examples, ceramics may be used as the insulating material to fill the remaining portions of pad 134.

An impedance value may be calculated through the current transmitting between an injector electrode 204 and formation 132 for each injector electrode 204. The voltage between button array 128 and return electrodes 130 may be measured and divided by the transmitted current to produce a value for the impedance seen by each injector electrode 204. Most of the transmitted current may be returned to return electrodes 130 although some portions of it may return through housing 202 and downhole tool 102 (e.g., referring to FIG. 1).

During logging operations, measurement data taken by pad 134 may include effects of resistivity and permittivity. Measurements may contain contributions from oil-based mud that is may be disposed between pad 134 and the wall of borehole 124 as well as the signal coming from the formation.

In general, the measurement medium of pad 134 may be modeled as a homogeneous formation with a thin layer of oil-based mud between pad 134 and formation 132. When pad 134 is placed on formation 132 without a mud layer, response measurement may only be from formation 132. However, when there is a mud layer present, the response is influenced by the thickness of the mud layer as well as the mud properties, in addition to the properties of formation 132 behind the mud layer. That being said, the response for certain formations 132 predominantly consist of the mud signal, which may make this response suitable for determining mud properties.

Figure 3:
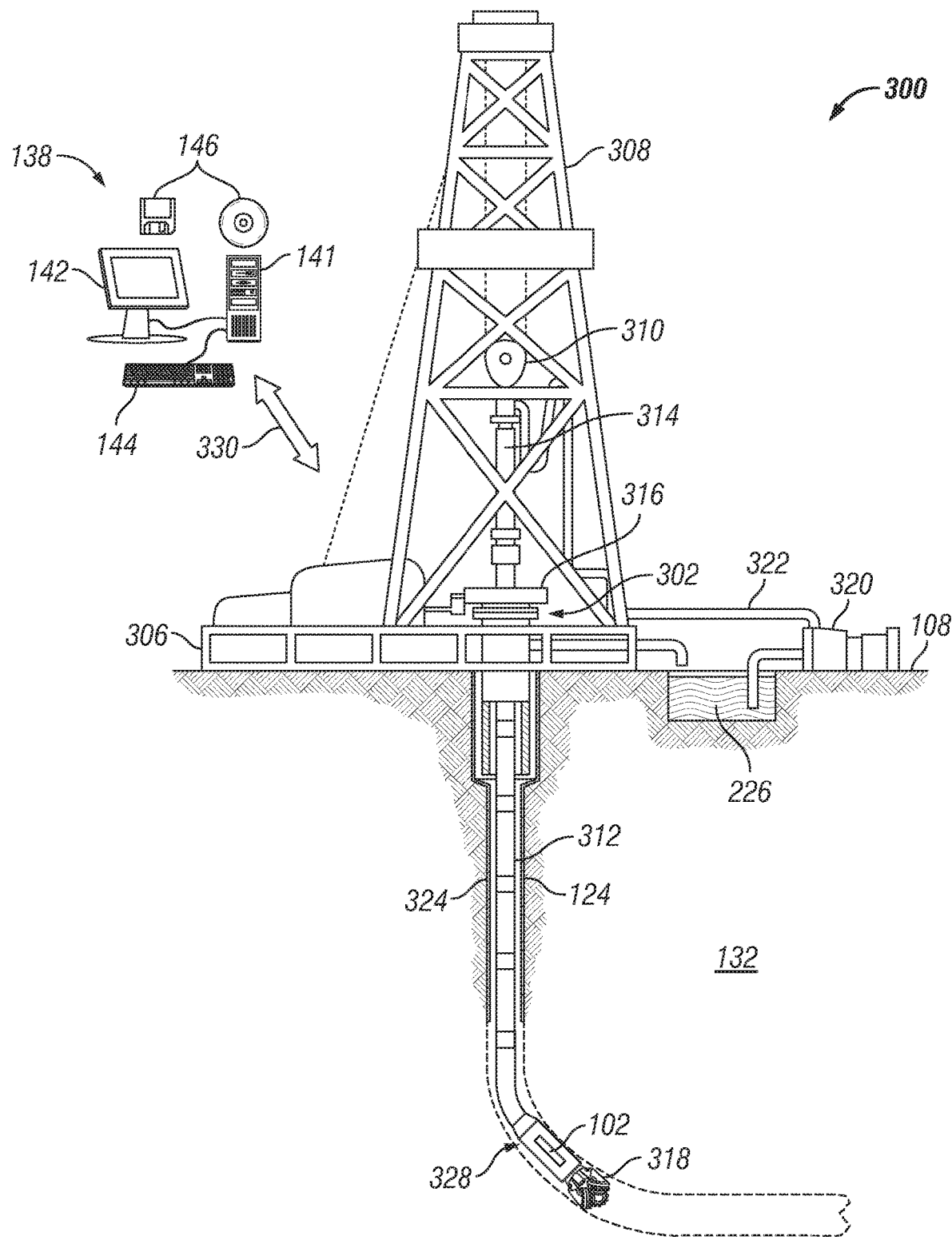
FIG. 3 illustrates another example of a well measurement system.

FIG. 3 illustrates an example in which downhole tool 102 may be disposed in a drilling system 300. As illustrated, borehole 124 may extend from a wellhead 302 into formation 132 from surface 108. As illustrated, a drilling platform 306 may support a derrick 308 having a traveling block 310 for raising and lowering drill string 312. Drill string 312 may include, but is not limited to, drill pipe and coiled tubing, as generally known to those skilled in the art. A kelly 314 may support drill string 312 as it may be lowered through a rotary table 316. A drill bit 318 may be attached to the distal end of drill string 312 and may be driven either by a downhole motor and/or via rotation of drill string 312 from surface 108. Without limitation, drill bit 318 may include, roller cone bits, PDC bits, natural diamond bits, any hole openers, reamers, coring bits, and the like. As drill bit 318 rotates, it may create and extend borehole 124 that penetrates various formations 132. A pump 320 may circulate drilling fluid through a feed pipe 322 to kelly 314, downhole through interior of drill string 312, through orifices in drill bit 318, back to surface 108 via annulus 324 surrounding drill string 312, and into a retention pit 326.

With continued reference to FIG. 3, drill string 312 may begin at wellhead 302 and may traverse borehole 124. Drill bit 318 may be attached to a distal end of drill string 312 and may be driven, for example, either by a downhole motor and/or via rotation of drill string 312 from surface 108. Drill bit 318 may be a part of bottom hole assembly 328 at distal end of drill string 312. Bottom hole assembly 328 may further include downhole tool 102. Downhole tool 102 may be disposed on the outside and/or within bottom hole assembly 328. Downhole tool 102 may include test cell 334. As will be appreciated by those of ordinary skill in the art, bottom hole assembly 328 may be a measurement-while drilling (MWD) or logging-while-drilling (LWD) system.

Without limitation, bottom hole assembly 328 may be connected to and/or controlled by information handling system 114, which may be disposed on surface 108. Without limitation, information handling system 114 may be disposed down hole in bottom hole assembly 328. Processing of information recorded may occur down hole and/or on surface 108. Processing occurring downhole may be transmitted to surface 108 to be recorded, observed, and/or further analyzed. Additionally, information recorded on information handling system 114 that may be disposed down hole may be stored until bottom hole assembly 328 may be brought to surface 108. In examples, information handling system 114 may communicate with bottom hole assembly 328 through a fiber optic cable (not illustrated) disposed in (or on) drill string 312. In examples, wireless communication may be used to transmit information back and forth between information handling system 114 and bottom hole assembly 328. Information handling system 114 may transmit information to bottom hole assembly 328 and may receive as well as process information recorded by bottom hole assembly 328. In examples, a downhole information handling system (not illustrated) may include, without limitation, a microprocessor or other suitable circuitry, for estimating, receiving and processing signals from bottom hole assembly 328. Downhole information handling system (not illustrated) may further include additional components, such as memory, input/output devices, interfaces, and the like. In examples, while not illustrated, bottom hole assembly 328 may include one or more additional components, such as analog-to-digital converter, filter and amplifier, among others, that may be used to process the measurements of bottom hole assembly 328 before they may be transmitted to surface 108. Alternatively, raw measurements from bottom hole assembly 328 may be transmitted to surface 108.

Any suitable technique may be used for transmitting signals from bottom hole assembly 328 to surface 108, including, but not limited to, wired pipe telemetry, mud-pulse telemetry, acoustic telemetry, and electromagnetic telemetry. While not illustrated, bottom hole assembly 328 may include a telemetry subassembly that may transmit telemetry data to surface 108. Without limitation, an electromagnetic source in the telemetry subassembly may be operable to generate pressure pulses in the drilling fluid that propagate along the fluid stream to surface 108. At surface 108, pressure transducers (not shown) may convert the pressure signal into electrical signals for a digitizer (not illustrated). The digitizer may supply a digital form of the telemetry signals to information handling system 114 via a communication link 330, which may be a wired or wireless link. The telemetry data may be analyzed and processed by information handling system 114.

As illustrated, communication link 330 (which may be wired or wireless, for example) may be provided that may transmit data from bottom hole assembly 328 to an information handling system 114 at surface 108. Information handling system 114 may include a processing unit 116 (Referring to FIG. 1), a video display 120 (Referring to FIG. 1), an input device 118 (e.g., keyboard, mouse, etc.) (Referring to FIG. 1), and/or non-transitory computer-readable media 122 (e.g., optical disks, magnetic disks) (Referring to FIG. 1) that may store code representative of the methods described herein. In addition to, or in place of processing at surface 108, processing may occur downhole.

Figure 4A:
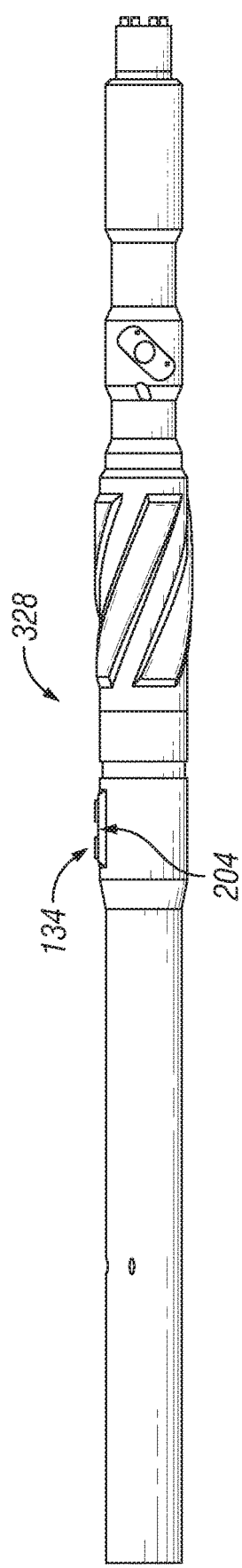
FIGS. 4A-4C illustrate an example of a pad.
Figure 4B:
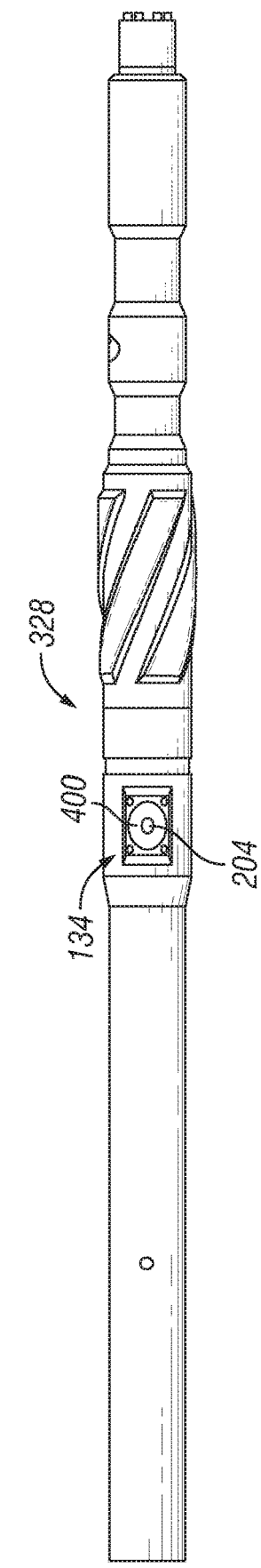
Figure 4C:
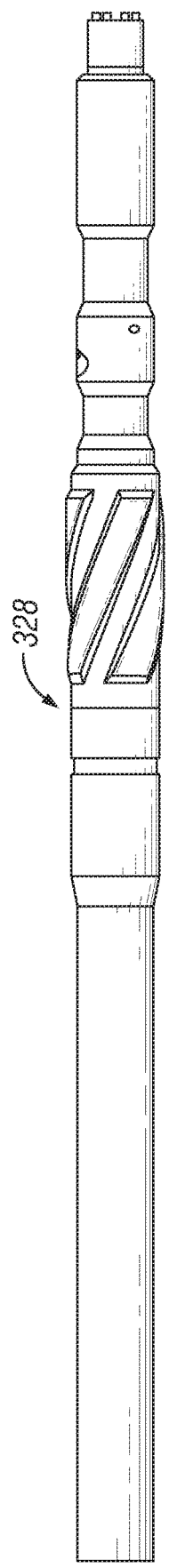

FIGS. 4A-4C illustrate an example of bottom hole assembly 328 that includes an example of a logging-while-drilling (LWD) and/or measuring-while-drilling (MWD) imaging oil based mud imager tool. As mentioned above, water based mud imagers may have similar designs, and may generally provide less design and interpretation complications than oil based mud imagers due to the conductive nature of the water based mud. As described below, bottom hole assembly 328 may provide a high resolution image of borehole 124 (e.g., referring to FIG. 3) and may be used to identify damaged sections of borehole 124. This may provide knowledge on thin beds in formation 132 and also provide images that may be used to determine a dip angle of formation beds.

In this example, oil based mud imager tool may include an injector electrode 204 and a guard electrode 400. Guard electrode 400 may surround the injector electrode 204 and may be in electrical contact with it. In examples, injector electrode 204 and guard electrode 400 may be excited by an alternating current, sine-wave generator, and it may be coupled to formation 132 (e.g., referring to FIG. 3) through the oil based mud. The mud is non-conductive for oil based muds, consequently, the coupling to formation 132 by displacement currents in the mud. This may allow injector electrode 204 and guard electrode 400 to sense impedance of formation 132 (e.g., referring to FIG. 3). This arrangement provides a low sensitivity to standoff changes in the microresistivity image.

In an LWD environment, the sensor topology can have minimum complexity, and more importantly, may not rely on contact with borehole 124 (e.g., referring to FIG. 3). During measurement operations, a current enters formation 132 from injector electrode 204, which may have a much lower resistivity than the mud. The current penetrates formation 132 and then returns back toward borehole 124 where it returns to bottom hole assembly 328. The body of bottom hole assembly 328 may remain at ground potential because of its large surface area.

Imaging is accomplished by dividing data into azimuthal bins as bottom hole assembly 328 (e.g., referring to FIG. 3) rotates in borehole 124 (e.g., referring to FIG. 3) during drilling operations. Thus, azimuthal coverage provided by individual injector electrodes 204 in a wireline oil based mud imager tool is obtained by the rotation of a single injector electrode 204 instead in the LWD/MWD case. In examples, LWD/MWD imager tool may also include multiple injector electrodes 204 separated axially or radially. Nonetheless, total number of injector electrodes 204 may be less than a wireline imager tool (e.g., referring to FIG. 1). Although mechanisms of how impedance images are obtained is different between LWD/MWD and wireline imager tools, the format of the resulting data may be the same. Therefore, processing methods disclosed below are equally applicable to both wireline tools and LWD/MWD tools.

Figure 5:
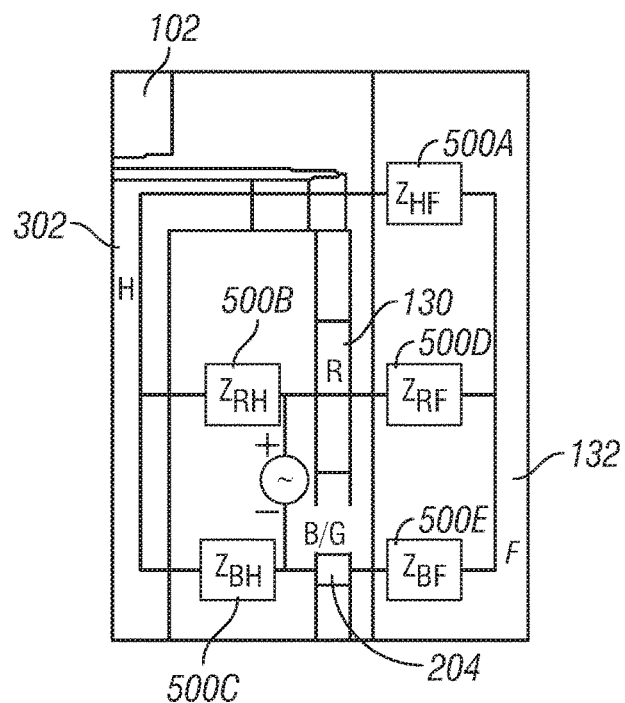
FIG. 5 is a circuit model that may approximate an isolated pad from FIG. 2.

FIG. 5 illustrates an example of a circuit model that may approximate the pad 134 illustrated in FIG. 2. Effects of the transmitted current may be approximately characterized by a housing-to-formation impedance value 500A, a return electrode-to-housing impedance value 500B, a return electrode-to-formation impedance value 500C, a button-to-housing impedance value 500D, and a button-to-formation impedance value 500E. Impedance may be calculated below, wherein Z is the impedance, $V_{BR}$ is the button-to-return electrode voltage and $I_B$ is the button current:

$$Z = \frac{V_{BR}}{I_B} \quad (1)$$

The value calculated in Equation (1) may be equal to $Z_{BF}+Z_{RF}$, as shown in FIG. 5, wherein $Z_{BF}$ is the impedance from injector electrode 204 to formation 132 and $Z_{RF}$ is the impedance of return electrode 130 to formation 132. Note that for different injector electrodes 204 of the button array 128, these impedances may differ based on the variations in borehole 124 (e.g., referring to FIGS. 1 and 2) and the environment. These variations in measured impedances in an impedance image may be used to determine geophysical features. Also note that both $Z_{BF}$ and $Z_{RF}$ have contributions from both the surrounding mud and formation 132 (e.g., referring to FIG. 1). Thus, equivalently it can be written in Equation (2) as:

$$Z \approx Z_{BF} = Z_{mud} + Z_F \quad (2)$$

As a result, measured impedance may have contributions from both the mud and formation 132, wherein $Z_{mud}$ is the impedance of the mud and $Z_F$ is the impedance of formation 132. Imaginary parts of $Z_F$ and $Z_{med}$ may be assumed to be mainly capacitive. Assuming this capacitance may be in parallel with the resistive portion, then $Z_{BF}$ may also be written as:

$$Z_{BF} = \frac{1}{\left(\frac{1}{R_M} + j\omega C_M\right)} + \frac{1}{\left(\frac{1}{R_F} + j\omega C_F\right)} \quad (3)$$

wherein $R_M$ is the mud resistance, $R_F$ is the resistance of formation 132, $C_M$ is the mud capacitance, $C_F$ is the capacitance of formation 132, j is the unit imaginary number, and $\omega$ is the angular frequency. Both the mud resistance and mud capacitance may increase as standoff increases and may decrease with the increase in effective area of injector electrode 204. "Standoff" may be used to denote the distance of the pad 134 (e.g., Referring to FIG. 3) from a wall of borehole 124 (e.g., referring to FIG. 1). Standoff of each injector electrode 204 in button array 128 may vary. In examples, standoffs of return electrode 130 may differ from those of injector electrodes 204 as well. Standoff variations may significantly affect button-to-formation impedance value 500E. In the simplified circuit model, it may be assumed that the standoff of each component of pad 134 may be constant. Standoff may assume that pad 134 is movable while downhole tool 102 remains immobile. In examples, to achieve large distances from the wall of borehole 124, downhole tool 102 may be moved along with pad 134. In examples, the term "eccentricity" may be used instead of "standoff". The proposed methods (discussed further below) may be equally valid whether pad 134 moves or both pad 134 and downhole tool 102 move.

Figure 6:
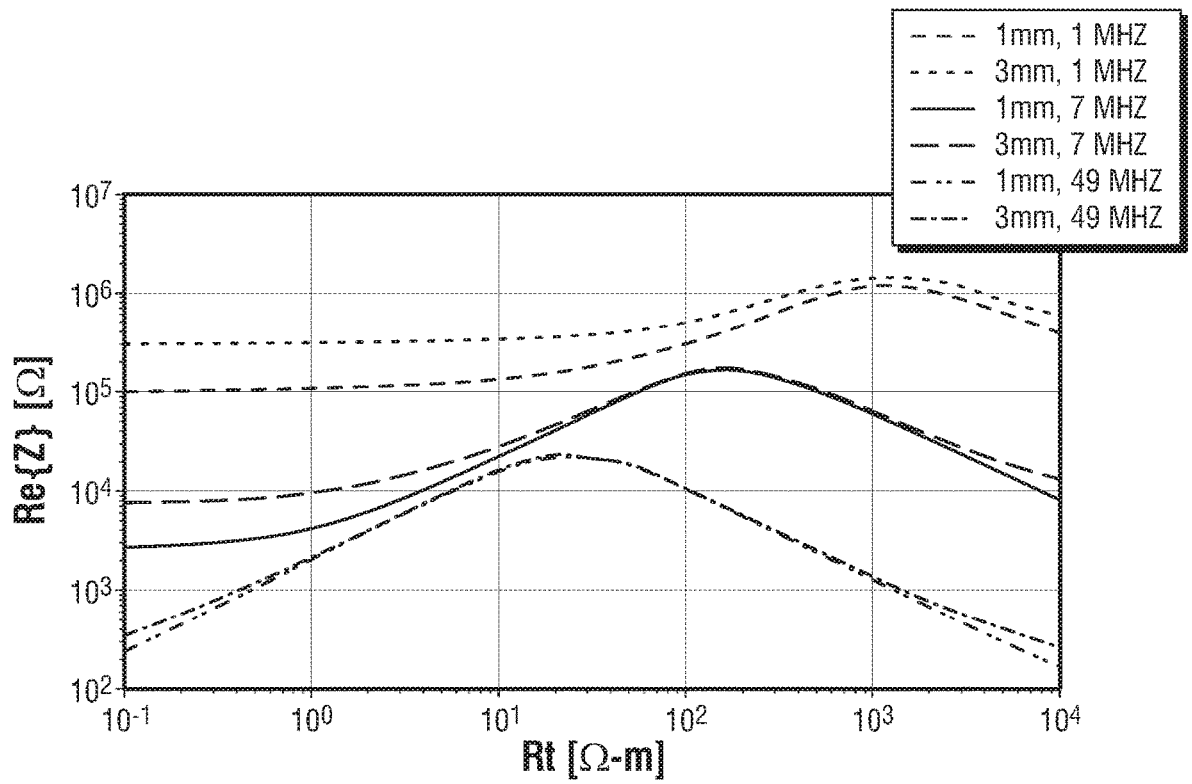
FIG. 6 is a graph illustrating a real part of measured impedance versus formation resistivity.

Equation (3) may be used to obtain basic performance curves for downhole tool 102. These basic performance curves may be fairly accurate in homogeneous formations 132 (e.g., referring to FIG. 1) in determining the variation of the response of an exemplary injector electrode 204 in button array 128 with changing environmental parameters. In FIG. 6, the real part of the measured impedance versus the formation resistivity may be determined using Equation (3), which is illustrated on graph in FIG. 6. The imaginary part of the impedance may be determined by the mud capacitance, therefore it may not be necessary to plot it. In an example, illustrated in FIG. 6, it may be assumed that formation permittivity ($\varepsilon_F$) is 15, mud permittivity ($\varepsilon_M$) is 6, and mud resistivity ($\rho_M$) is 8000 Ω-m. Results for three different frequencies (1 MHz, 7 MHz and 49 MHz) at two different standoffs (so=1 mm and so=3 mm), where (so) stands for standoff of the tool, may be displayed in FIG. 6.

As illustrated in FIG. 6, a separation between different standoffs at lower formation resistivities may be viewed. This effect may be more pronounced if the frequency is lower. At higher formation resistivities, the dielectric effect in formation 132 (e.g., referring to FIG. 1) may cause a roll-off in measured impedance, as illustrated in FIG. 6. Operating in a linear region of the curve, displayed in FIG. 6, may produce a more accurate correspondence between the impedance image and that of the true formation resistivity. The standoff effect at low formation resistivities may cause an ambiguity in the interpretation of the impedance images. These raw measurements may be used, but the contrast of the resistivity image may be reduced. Furthermore, small errors in standoff measurements may cause a large difference in the impedance reading. It may be observed from FIG. 4 that measured impedance may begin to decrease as the formation resistivity increases. This "rolloff" may be caused by the dielectric effects in the formation 132 (e.g., referring to FIG. 1) and may become more pronounced at higher frequencies.

The graph in FIG. 6 illustrates that lower frequencies may be more suitable for measuring high formation resistivities while higher frequencies are more suitable to measure lower formation resistivities. For this reason, downhole tool 102, which may be a downhole imaging tool, such as an oil based mud imager or water based mud imager, may generally be implemented as multi-frequency tools. Multi-frequency measurements may also reduce uncertainty in resolving different mud and formation properties through an inversion or machine learning process. Operational frequencies of downhole tool 102 (e.g., referring to FIGS. 1 and 3) may be adjustable through a central control unit and may be changed based on the specifications of the job.

Figure 7:
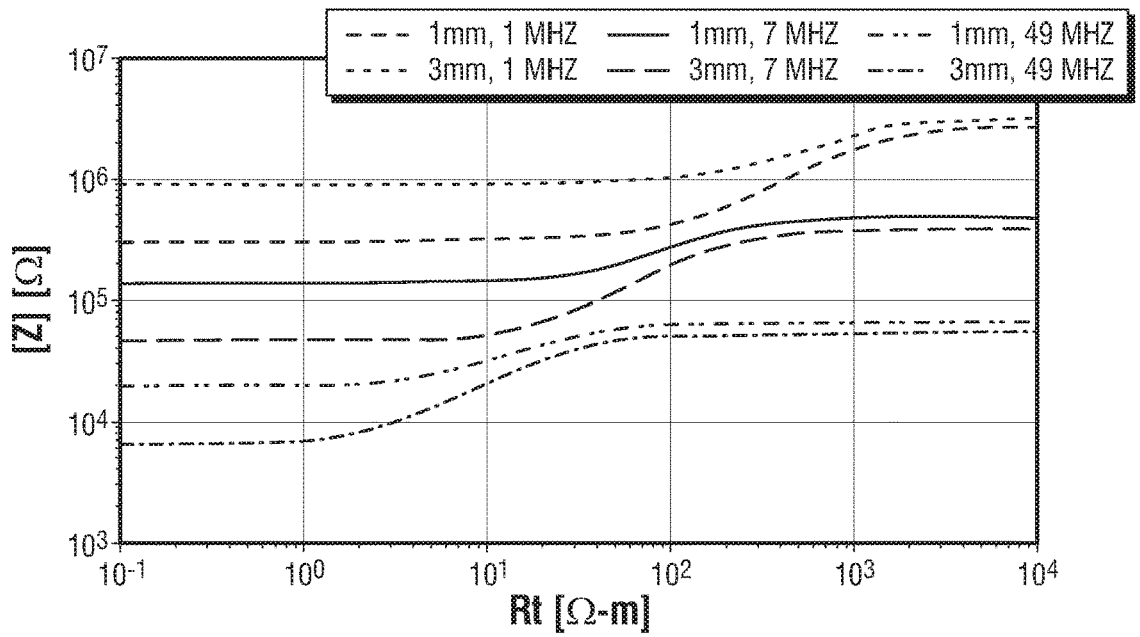
FIG. 7 is a graph illustrating an absolute value of the impedance versus the formation resistivity.

The graph in FIG. 7 illustrates an absolute value of the impedance versus the formation resistivity for the same case in FIG. 6. As illustrates, the absolute value of the impedance does not suffer a "roll-off" due to the dielectric effect at high formation resistivities although the sensitivity of downhole tool 102 (e.g., referring to FIG. 1) to the resistivity is reduced. For example, the absolute value is almost flat with changing formation resistivity.

Results from the graphs of FIGS. 6 and 7 of a simplified circuit approximation illustrate that the impedance measured by an oil based mud imager tool may not accurately reflect the variations in formation resistivity due to the effects of formation permittivity, mud resistivity and mud permittivity. Currently, inversion based approaches have been used to determine the formation resistivity (along with other formation and mud parameters) from measurements. These model-based inversion techniques are based on simulating the response of downhole tool 102 (e.g., referring to FIG. 1) using a forward model. For example, a forward model may be obtained with a 3D electromagnetic simulation software. Then, the parameters that minimize the difference between the measurements and the model response corresponding to these parameters are returned as the inversion output. In examples, an iterative process may be used for this purpose, such as the Gauss-Newton method. Depending on the accuracy of the forward model used in inversion, inversion results may vary in accuracy. Additionally, it may be beneficial to apply regularization and use known relationships between inverted parameters in an inversion approach.

As discussed below, in other examples, a supervised machine learning type of approach may be utilized to find a regression function that relates the measurements to formation resistivity, as well as other formation and mud parameters. The machine learning discussed below is an improvement over current technology in that a machine based approach utilizes a regression function that is determined using a training dataset in the machine learning based approach and whenever a new image log is obtained, it may directly be plugged in to the already determined regression function to determine the desired formation and mud parameters. On the other hand, in current technology using the inversion approach described above, whenever a new dataset is obtained, a new cost function using only that dataset is calculated. A second difference is the cost function of traditional inversion involves formation and mud parameters as inputs, whereas in the machine learning approach, measurements of downhole tool 102 (e.g., referring to FIG. 1) are the inputs to the regression function and model parameters are the outputs. Once a machine learning algorithm is trained, the resulting regression function(s) may be used for predicting mud and formation parameters for any new measurements that may be obtained. Thus, machine learning methods may provide speed advantages in comparison with the inversion approach.

However, a regression function of a machine learning algorithm is an approximation of the true behavior of downhole tool 102 (e.g., referring to FIG. 1), so its accuracy may be less than that obtained with a traditional inversion approach. Additionally, enforcing known relationships between parameters through regularization may not be complicated in view of inversion based approaches. Thus, hybrid quantitative interpretation techniques that combine machine learning and inversion based techniques in specific manners are provided below. The methods and systems discussed below make use of individual strengths of both machine learning methods and inversion methods to obtain an algorithm that is robust and efficient.

Figure 8:
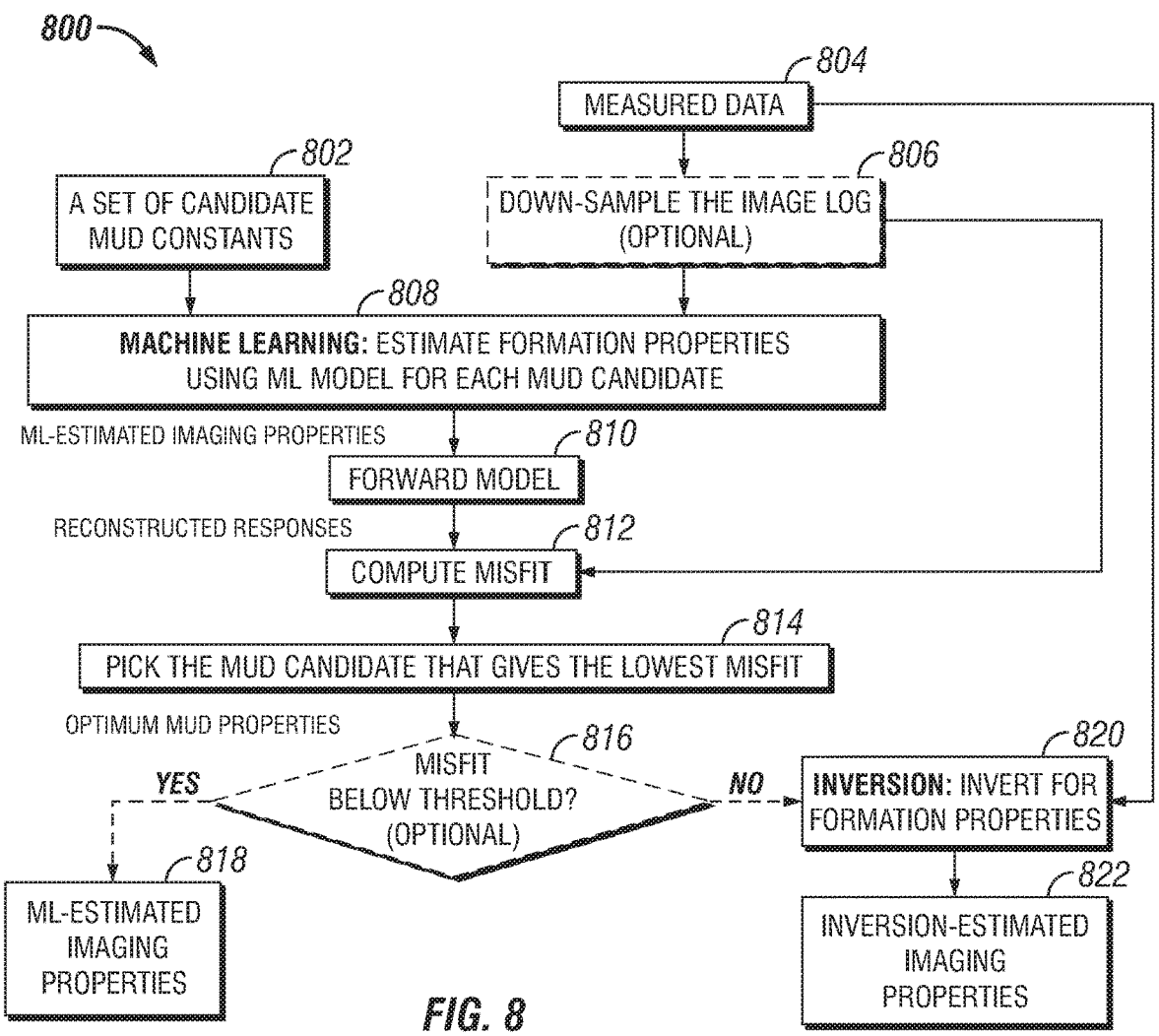
FIG. 8 is an example of a machine learning workflow which may be utilized to determine mud parameters which may then be fed into an inversion algorithm.

FIG. 8 illustrates a hybrid workflow 800 in which machine learning techniques may be utilized to determine mud parameters which may then be fed into an inversion algorithm. In this example, a set of machine learning models may be trained for different mud candidates. Machine learning models may relate the measurements to electromagnetically relevant imaging parameters for a given mud candidate. Relevant imaging parameters may include formation resistivity, formation permittivity and stand-off between button electrodes and the formation. Formation resistivity and permittivity may be frequency dependent. Formation permittivity may also be represented as a complex quantity. Workflow 800 may begin with block 802. In block 802 a set of candidate mud constants is identified. These mud candidates represent the properties of the mud that is relevant for its electromagnetic response. For example, each mud candidate may include a unique pair of mud relative permittivity and mud angle (i.e. the phase angle of the mud impedance in the complex plane.) In other examples, each mud candidate may include a unique pair of mud resistivity and mud relative permittivity. Additionally, the set of mud candidates may cover the expected range of included parameters with a fine enough grid to minimize the errors related to the quantization of mud properties. For example, relative permittivity of oil based muds may range from 1.5 to 12, while mud angle may range from −70° to −90°. The grid of parameters may consist of every possible mud relative permittivity and mud angle combination within this range with a spacing of 0.5 for permittivity and 0.2° for mud angle. In general, these properties of mud may be frequency dependent. Thus, mud candidates may include unique sets of mud properties at every operating frequency of downhole tool 102 (e.g., referring to FIG. 1). However, frequency dependence of the mud angle and mud relative permittivity may be low, for example 0.05 (unitless) per MHz for permittivity and 0.03° per MHz for mud angle, which allows these properties to be assumed as constants over frequency. Thus, forming mud candidates that consist of these two parameters may be advantageous computationally since a new machine learning model may be trained for each mud candidate which is a time consuming effort. In examples within this disclosure, relative permittivity may be also be referred to as permittivity and mud candidates will be assumed to be consisting of unique pairs of frequency independent mud angles and mud permittivities without the intent of any loss of generality.

Block 804 may be performed before, after, or during block 802. In block 804, downhole tool 102 (e.g., referring to FIG. 1) may perform one or more measurement operations and form an image log from the one or more measurements. In block 806, a down-sample of the image log may be performed as an optional step. Within this disclosure, down-sampling refers to any operation that reduces the amount of input data. For example, this may include selecting a small section of the image log and using the selected section to make machine learning predictions, discussed below, for different mud candidates. Additionally, a selection of a section within the image log may be based at least in part on the section's sensitivity to mud. Such a section may be selected manually by an operator, or may be selected automatically. Automatic selection may be performed using data from another resistivity tool run in tandem with downhole tool 102. For example, these reference tools may include one or more induction tools. Thus, zones where the reference tool reads a low resistivity may be selected in such a scheme. However, automatic selection may be based at least in part on data recorded during measurement operations performed by downhole tool 102. Referring to FIG. 7, regions where the absolute value of the imager signal is relatively low have the highest sensitivity to mud. Therefore, zones of an image log with lower absolute impedances compared to other zones may be selected during the down-sampling process.

Another method to down-sample data may be by throwing out depth points. For example, every 10th depth point for each injector electrode 204 (e.g., referring to FIG. 2) may be kept. In other examples, data from selected injector electrodes 204 may be used. Yet, in other examples, measured data may be filtered, for example through an averaging operation. Additionally, it may be possible to perform a combination of the above mentioned methods. After this optional step, data (down-sampled or otherwise) may be sent to block 808 with outputs from block 802.

In block 808, selected mud candidates from block 802 and measured data from block 804 or optionally down-sampled data from block 806, are input into one or more machine learning models for each mud candidate. Machine learning models may produce estimates for different imaging properties (i.e., formation properties and standoff) In examples, machine learning models may be obtained by training a machine learning algorithm for each specific mud candidate. For example, one type of machine learning algorithm may be an artificial neural network.

Figure 9:
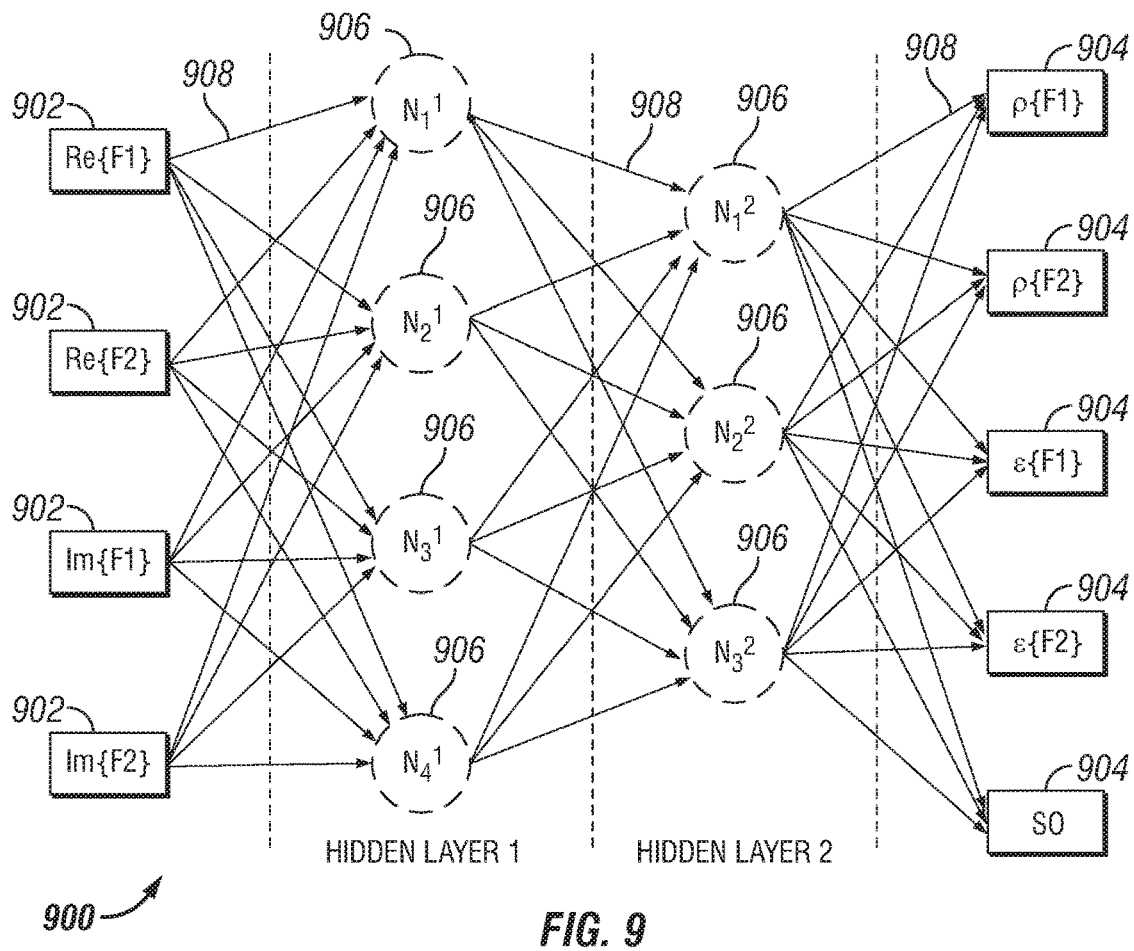
FIG. 9 is an illustration of an artificial neural network.

Referring to FIG. 9, artificial neural network 900 may include one or more inputs 902 and outputs 904. For a given set of inputs 902 and outputs 904, artificial neural network 900 may determine a regression function that provides an optimal relationship between one or more input 902 and one or more outputs 904. Optimization is based on minimizing a cost function similar to the traditional inversion-based approaches. Similar to how biological neurons operate, it is assumed that information between inputs 902 to outputs 904 is passed through connections (edges) in artificial neural network 900. In most neural network solutions, additional internal (hidden) nodes 906 may be introduced to increase the number of connections and improve the accuracy of the solution. Nodes 906 may be interconnected to inputs 902 and outputs 904 as well as each other. In examples, there may be multiple layers of nodes 906 that may be hidden. Artificial neural network 900 illustrated in FIG. 9 includes two hidden layers. However, artificial neural network 900 is not limited in the number of hidden layers or the number of nodes 906 that may be within each layer. However, large networks lead to a large computational time. Additionally, the number of nodes 906 and hidden layers are called the hyperparameters of artificial neural network 900. As illustrated, within the two hidden layers, one or more connections 908 connect one or more inputs 902 to one or more nodes 906 within the first hidden layers. Nodes 906 in the first hidden layer will furthermore be connected to one or more nodes 906 in the second hidden layer. Finally, nodes 906 in the second hidden layer will be connected to one or more outputs 904. As illustrated, inputs 902 and outputs 904 in artificial neural network 900 are not connected directly to each other but through one or more nodes 906 through one or more hidden layers within artificial neural network 900.

As an illustrative example, with continued referent to FIG. 9, artificial neural network 9000 may include inputs 902 that may include real and imaginary parts of the impedivity measured by injector electrodes 204 (e.g., referring to FIG. 2) in downhole tool 102 (e.g., referring to FIG. 1) for each of the operating frequencies of downhole tool 102. In this example, intrinsic differences between injector electrodes 204 are not considered. Additionally, it is assumed that downhole tool 102 operates at two distinct frequencies F1 and F2. Frequency F1 and F2 are chosen based on the environment in which measurement operations are performed. For this example, the chosen frequency are inconsequential. Measured data, referring to FIG. 8, from block 802 or 804 may include Re{F1}, Re{F2}, Im{F1} and Im{F2} for a single image pixel, which identifies a measurement location. Here, Re stands for the real part of the measurement while/m stands for the imaginary part of the measurement.

Outputs 904 for artificial neural network 900 are $\rho\{F1\}$, $\rho\{F2\}$, $\varepsilon\{F1\}$, $\varepsilon\{F2\}$. In this example, $\rho\{F1\}$ is the resistivity of formation 132 (e.g., referring to FIG. 1) at F1, $\rho\{F2\}$ is the resistivity of formation 132 at F2, $\varepsilon\{F1\}$ is the relative permittivity of formation 132 at F1, $\subset\{F2\}$ is the relative permittivity of formation 132 at F2 and so is the standoff. As mentioned above, alternate representations of the formation properties may exist. Mud properties are assumed to be constant in this representation and a different neural network should be constructed for each mud candidate for block 802 (e.g., referring to FIG. 8).

As discussed above, there may be any number of nodes 906 within any number of hidden layers in artificial neural network 900. As illustrated in FIG. 9, artificial neural network 900 may include two hidden layers. A first hidden layer has four nodes 906 while a second hidden layer has three nodes 906. Each connection may have a certain weight. These weights define the value of each node 906 in terms of the values of other nodes 906 with outgoing connections 908 to the identified node 906. For example, node 906 with label $N_1^{\,1}$ has incoming connections 908 from each input 902. Thus, value of node (N11) may be expressed as:

$$N_1^1 = f(\theta_{10}^1 + \theta_{11}^1 XRe\{F1\} + \theta_{12}^1 XRe\{F2\} + \theta_{13}^1 XIm\{F1\} + \theta_{14}^1 XIm\{F2\}) \quad (8)$$

In Equation 8, $\theta_{11}^1$ is the weight between the connection of node $N_1^1$ and input $Re\{F1\}$ and so on. In general, $\theta_{ij}^k$ may denote the weight of the connection between node $N_i^k$ and node $N_j^{k-1}$ where input 902 may be assumed to be $N_1^0 = Re\{F1\}$ and so on while output 904 may be $N_1^3 = \rho\{F1\}$ and so on. In examples, $f$ denotes a specified function called the activation function. As an example, $f$ may be the sigmoid function with the definition given by Equation 9, seen below.

$$\sigma(x) = \frac{1}{1 + e^{-x}} \quad (9)$$

Thus, the output layer may have a linear or rectified linear activation function. Although not depicted in the above example, an additional bias node may generally be added to each layer (other than the output layer) to provide a constant offset to the values. Bias nodes do not have incoming connections and they only provide outgoing connections to the subsequent layer. By convention, bias nodes have a value of 1. For example, $\theta_{10}^1$ in Equation 8 above denotes the weight of the connection between this bias term and the node $N_1^1$. By optimizing the weights of connections 908, artificial neural network 900 may be able to determine a regression function.

For optimization, a training dataset is used. This dataset will have known inputs 902 and outputs 904. In examples, a training, validation, and testing dataset may be formed synthetically through electromagnetic simulations. For each mud candidate, a tool response of downhole tool 102 (e.g., referring to FIG. 1) obtained through simulations for different imaging parameters may be recorded. A large portion of these samples may be used in training (such as 80% of the samples) while the rest may be used in validation and testing as described below. In examples, the parameter set for each sample of the training dataset is denoted as $\overline{X}_i^T$ where i changes from 1 to N where N is the number of samples in the training dataset. Then, a cost function for the artificial neural network 900 may be denoted as:

$$\arg_{\overline{\theta}} \min \Sigma_{i=1}^N \|\overline{X}_i^T - \overline{X}^N(\overline{T}^i, \overline{\theta})\| \quad (10)$$

In $\overline{X}^N(\overline{T}^i, \overline{\theta})$ represents output 904 of artificial neural network 900 for the $i^{th}$ training set with training measurements of $\overline{T}^i$ and $\overline{\theta}$ is the weight of connections 908 of artificial neural network 900 over which the cost function is minimized. In examples, a cost function may be the mean square error between the prediction of artificial neural network 900 and a training set as illustrated in Equation 10. As noted above, other forms of error definitions may be used and additional regularization terms to the cost function may be added as well.

Once an artificial neural network 900 is produced using a training dataset, a validation dataset not used in training may be used to determine if artificial neural network 900 may be able to predict results with accuracy. This approach prevents overfitting, which is when artificial neural network 900 may be optimized for the training set but cannot predict data outside the training set with accuracy. For validation, the value of a cost function such as the one in Equation 10 may again be computed on the validation dataset. If the error is high, neural network parameters may be updated in order to improve results. Finally, results may be tested on yet another, independent dataset called the testing dataset to classify the final error. The primary purpose of the testing dataset is cross-validation. In cross-validation, datasets are divided into random training, validation, and testing parts and the combination of datasets that has the minimal testing error may be selected at the end as artificial neural network 900.

In examples, training, validation, and testing datasets may be constructed experimentally as well by making measurements in a controlled environment such as a test tank where materials with known properties may be used to form an artificial mud and formation. Mud and formation properties may be adjusted to obtain measurements for different conditions. However, this approach may be slow and costly compared to obtaining tool responses through electromagnetic simulations.

Previous implementation depicted a concurrent solution of all the output parameters. In other cases, it may be beneficial to obtain a solution by dividing outputs 904 into groups, selecting inputs 902 suitable for each of the groups and producing separate artificial neural network 900 for each group. For example, referring to FIG. 9, two separate artificial neural network 900 may be trained, one for formation resistivity outputs ($\rho\{F1\}$ and $\rho\{F2\}$) and one for permittivity and standoff ($\epsilon\{F1\}$ and $\epsilon\{F2\}$.) Furthermore, in training the artificial neural network 900 for the permittivity and standoff it may be assumed that the formation resistivities ($\rho\{F1\}$ and $\rho\{F2\}$) are known. Thus, during a prediction stage, outputs 904 of a first artificial neural network may be fed into a second artificial neural network as inputs 902. This method represents a sequential approach and is depicted in FIG. 10.

Figure 10:
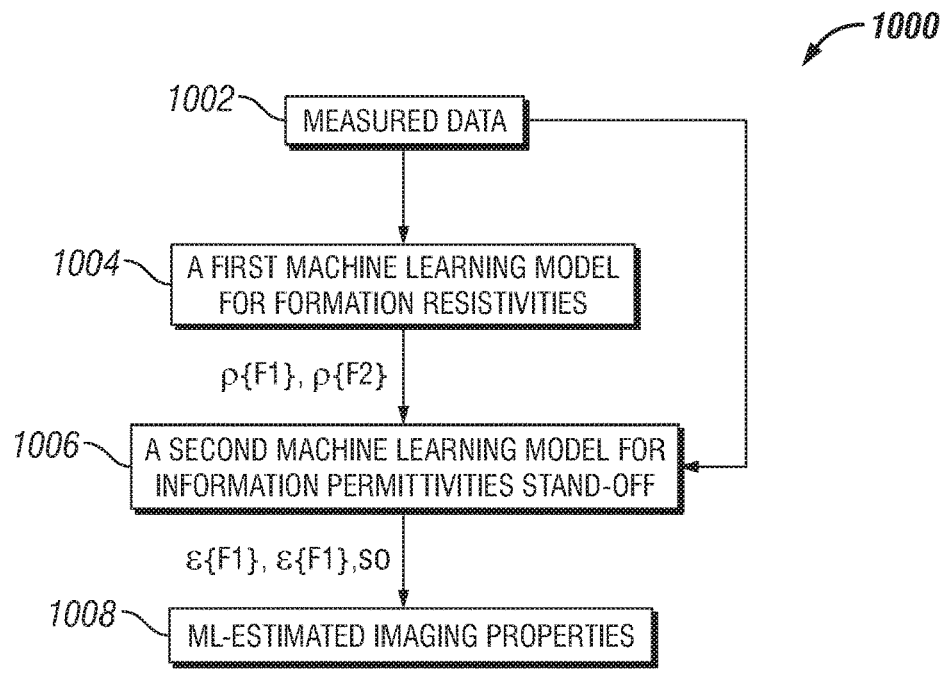
FIG. 10 is an example of a workflow for a sequential machine learning algorithm.

FIG. 10 illustrates workflow 1000 for a sequential machine learning algorithm. Workflow 1000 may begin with measuring data in block 1002, which is similar to block 804 (e.g., referring to FIG. 8). The measured data, as an output from block 1002, is input a first machine learning model for formation resistivities into block 1004. The machine learning model may be similar to artificial neural network 900 (e.g., referring to FIG. 9). The output from block 1004 is input into a second machine learning model for formation permittivities and a third machine learning model for standoff in block 1006. The outputs from block 1004 and block 1006 is the machine learning estimated imaging properties in block 1008 which comprise of formation resistivities at two frequencies, formation permittivities at two frequencies and standoff. In another example, a recurrent solution may be applied such that an estimate for a given depth point or a given injector electrode 204 (e.g., referring to FIG. 2) are used as inputs to artificial neural network 900 for estimating the imaging parameters of an adjacent depth point or injector electrode 204. Such a solution may help regularize the outputs and prevent large changes.

As trained machine learning models, referring to FIGS. 9 and 10, may be stored and used for predictions later, it may be possible to store a large amount of machine learning models corresponding to different mud candidates before the actual measurements take place. As mentioned previously, mud candidates may consist of the combinations of the mud angles that span the range of −90° to −70° with 0.2° intervals and permittivities from 1.5 to 12 (unitless) with 0.5 intervals. This would correspond to (101 times 22=2222 stored models).

Referring back to FIG. 8, block 808 estimates formation properties using one or more machine learning models for each mud candidate. These estimated properties, along with the corresponding mud properties for a given mud candidate may then be inputted to a forward model in block 810. The forward model represents an electromagnetic tool model that models tool response (i.e. simulated tool measurements) for a given set of formation and mud parameters. The circuit model illustrated in FIG. 5 constitutes a basic forward model. In practical applications, more sophisticated models based on computational electromagnetic techniques may be employed. Commercial electromagnetic solvers may be used for this purpose. Forward models used in this step may be the same as the one used in training the machine learning model, discussed above. The same forward model may also be used in the inversion step. In examples, forward model responses may be computed beforehand, and a database may be created. In this case, since not every possible combination may be simulated, an interpolation may be applied to find the response for an arbitrary input. The output from forward model in block 810, simulated tool measurements, is the input for block 812.

In block 812 a misfit is calculating between forward model response from block 810 and measured data from either block 804 or after down-sampling the measured data in block 806. The misfit may be defined as:

$$\|\overline{R} - \overline{R}^{ML}\| \qquad (11)$$

Here, $\overline{R}$ denotes the actual tool measurements while $\overline{R}^{ML}$ denotes the reconstructed machine learning responses, that is the simulated tool measurements obtained from the forward model. Overbars denote that these parameters may be multidimensional arrays with dimensions spanning depth, imager buttons, and frequencies. Double bars denote the $L^2$ norm operation. However, alternative definitions for the misfit such as the $L^1$ norm may be used. It may also be desirable to normalize the misfit quantity as well. This may be accomplished by dividing the quantity inside double bars in Equation (11) by $\overline{R}$. The norm may further be divided by number of samples to reduce the dependence of the resulting value on the sample size. In other cases, some regularization terms may be added as well. For example, regularization terms may penalize extremely small or large parameters. In examples, the term "cost function" rather than misfit may be more appropriate although these two terms are frequently used interchangeably.

Once the misfit is calculated for each mud candidate in block 812, the mud candidate with the lowest misfit value may be returned as the best representative of the actual mud in block 814. In variations of this method, an interpolation (curve-fitting) operation may be applied to find the optimum mud candidate, assuming the misfit is a smooth function of the mud parameters. This is a multidimensional interpolation where the misfit is a function of mud parameters. A smooth curve (for example a second order polynomial) may be fit to this function, for example in the least squares sense and the mud parameters that produce the minimum of the smooth curve may be returned. As a further variation on this method, and to reduce the computational run time as alluded to earlier, misfits may be calculated sequentially for each mud candidate as the machine learning models are being run. If the misfits are beginning to increase in a certain direction, for example, as the mud permittivities are increased over a certain value, the mud candidates that had not been run yet in that direction may be abandoned to prevent unnecessary computations. In other examples, predictions may at first be made on a coarse grid and the approximate values for the mud candidate with the lowest misfit is obtained. For the aforementioned example, mud angle spacing may be selected as 1° in a coarse grid, while the permittivity spacing may be selected as 1.5 This reduces the number of mud candidates to (21×8) 168. A finer grid may be run around this mud candidate to improve the accuracy; for example using a spacing of 0.1° between the mud angle giving the lowest misfit and its nearest neighbors in the coarse grid and a spacing of 0.25 for the mud permittivity giving the lowest misfit and its nearest neighbors in the coarse grid. From block 814 an optional step may be implemented in block 816.

In block 816, a misfit may be compared to a predetermined threshold. If the misfit is less than a certain value, imaging parameters obtained using the machine learning approach may be deemed accurate enough without the need for further inversion processing in block 818. For example, if a normalized $L^2$ norm divided by number of samples definition of the misfit is used, a threshold of 0.01 (i.e. 1% average error) may be used for this purpose. In examples, this optional step assumes that data is either not down-sampled or results from down-sampled data is sufficient for interpretation purposes. Alternatively, if down-sampling consists of selection of a zone in the image log, machine learning results may be used instead of inversion in just that zone if the misfit is below the threshold. If the misfit is not below the selected threshold in block 816, then imaging parameters obtained using the machine learning may be up sampled and used as initial guesses to the subsequent inversion algorithm in block 820. In this case, machine learning results may be outputted for quality control purposes to compare the results with inversion outputs as well.

In block 820, an inversion algorithm is applied to the results in block 816 to solve for the remaining imaging parameters assuming the mud characteristics is equal to those obtained through the previous steps. Inversion may take the original non-down sampled data as input. Obviously, this is not meant to limit the scope of the disclosure, and it is plausible that in examples data that has been down sampled, filtered etc. are inputted to the inversion. Inversion represents the process of matching the results of a forward model to the measurements such that a cost function is minimized. Then, the parameters that minimize the cost function (for example, by minimizing the difference between the measurements and the model response corresponding to these parameters) are returned as the inversion output. An iterative process may be used for this purpose, such as the Gauss-Newton method. In examples, model responses may be simulated beforehand within a grid in the expected parameter range. Then, the response for the desired parameters may be found via multidimensional interpolation if it does not lie on the grid. Equation 12 shows the essence of the inversion process:

$$\arg_{\overline{X}} \min \|\overline{I} - \overline{I}^M(\overline{X})\| \qquad (12)$$

Equation (12) is analogous to Equation (11), specifically, finding the parameter set ($\overline{X}$, where overbar represents that parameter set may be a vector) that minimize the difference between the measurements of the imager (denoted as $\overline{I}$) and the modeled response ($\overline{I}$') corresponding to a given parameter set.

However, a different notation is utilized in Equation (11) has been used for the measurements. The intention is to identify that in Equation (11) the misfit over the whole (down sampled) measurement dataset is minimized, while in Equation (12), minimization may be performed pixel by pixel, that is for each individual measurement point in depth and azimuth dimension. Additionally, even for a single pixel, multiple measurements corresponding to real and imaginary part of the signal (or equivalently absolute value and phase of the signal) at each of the operating frequencies exist for downhole tool 102 (e.g., referring to FIG. 1). Thus, the measurements still constitute a matrix. As before, double bars denote the norm operation, minimization is in the least squares sense, which is one of the possible implementations. Again, as mentioned for the case of minimizing the misfit for the machine learning algorithms in block 812, in some implementations a regularization term may be added to the cost function.

In examples, Equation (12) needs to be solved for each pixel. Thus, a different parameter set is found for each pixel. Finally, the resulting set of imaging properties may be returned as the result of the algorithm. These values may then be displayed as an image on video display 120 of information handling system 114 (e.g., referring to FIG. 1) and/or may be used as the input for other algorithms. Examples of these other algorithms may include formation dip picking algorithms, and algorithms for texture and facies classification.

Figure 11:
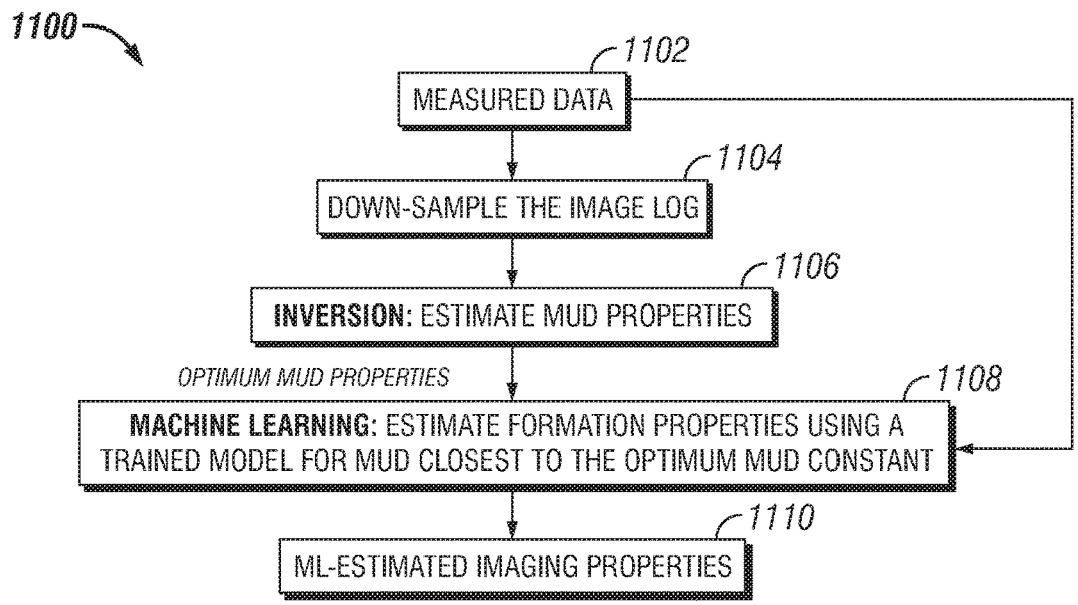
FIG. 11 is an example of a workflow in which imaging properties are determined by performing an inversion first and then performing machine learning.

As discussed above in FIG. 8, hybrid quantitative interpretation workflow 800 may first utilize machine learning in blocks 802 through 814 and then run an inversion in block 820. In FIG. 11, a second hybrid interpretation workflow 1100 where imaging properties are determined through machine learning by performing an inversion first to determine mud properties and then performing a machine learning prediction using a machine learning model corresponding to the inverted mud properties is shown. In this example, the accuracy of the inversion based approach may be used to obtain an accurate estimate of the mud properties. Workflow 1100 may begin with block 1102, in which downhole tool 102 (e.g., referring to FIG. 1) is used in a measurement operation to produce measured data. The measured data is used to produce an image log. Since the inversion approach is relatively slow, the image log in block 1102 is downsampled in block 1104 before feeding them into inversion in block 1106. The inversion in block 1106 may return the parameter set that minimizes the cost function as given in Equation (13).

$$\arg_{\overline{X}} \min \left\| \overline{\overline{R}} - R^M(\overline{X}) \right\| \qquad (13)$$

Note that in this case, $\overline{R}$ was used to denote the measurements instead of $\overline{\overline{I}}$, again to differentiate nature of the measurements from those used in inversions described above, because the inversion in workflow 1100 is not pixel based and a single parameter set is inverted from the total response. It should also be noted that although the goal is to invert slowly varying mud parameters, parameter set includes coarse estimates of formation parameters and standoff. These coarse estimates of imaging parameters are also needed as inputs to the forward model but are intermediate products that are not needed beyond this step. As discussed above, measurement zones with high sensitivity to mud may be preferred as inputs for block 1106. It may also be desirable that the formation properties in the selected zone do not fluctuate. Selection of such zones may be performed by techniques described above. For example, a reference resistivity tools running in tandem with downhole tool 102 (e.g., referring to FIG. 1) may be used to determine low resistivity layers. Either through visual inspection or by calculating the variation of resistivity and determining layer boundaries, homogenous low resistivity layers may be detected and used. In other examples, imager data itself may be used for this purpose. For example, zones where the data has low variation (in depth and across buttons) and has relatively low absolute value may be selected for inversion of mud properties.

Once the optimum mud properties is determined through inversion, measurement data may from block 1106 be an input in to block 1108. Block 1108 is a trained machine learning algorithm corresponding to this mud constant (or, if an exact match does not exist, closest to it) to obtain imaging parameters in fine scale. A measure of closeness of mud parameters is implementation dependent. For the example implementation where the mud parameters were the frequency independent mud angle and mud permittivity, closeness may be measured by:

$$\arg_{\tilde{\Phi}_M, \tilde{\varepsilon}_M} \min(w1 \times |\Phi_M^i - \tilde{\Phi}_M| + w2 \times |\varepsilon_M^i - \tilde{\varepsilon}_M|) \qquad (14)$$

where ($\Phi_M^i$, $\varepsilon_M^i$) represents the mud angle and permittivity pair obtained through inversion, ($\tilde{\Phi}_M$, $\tilde{\varepsilon}_M$) represent a mud angle and permittivity pair for which a trained model exists, and w1 and w2 are implementation dependent weights.

In examples, a new machine learning model that exactly correspond to the inverted mud properties may be trained at this stage, which is different than discussed above. Training database may be obtained through an interpolation of the databases already simulated. For higher accuracy, and if a fast enough forward model exists, training database may also be created from scratch through simulations. Imaging parameters returned by the machine learning are then returned in block 1108. In block 1110 these parameters may either be visualized as an image on a video display 120, and/or may be used as inputs for other algorithms on information handling system 114 (e.g., referring to FIG. 1).

For workflows 800 and 1100, discussed above, preconditioning and post-processing steps may be employed to improve accuracy and reduce noise and errors. Preconditioning may include a calibration of the obtained data to make sure the measurements are consistent with the data used in training the machine learning system and/or the forward model used in inversion. Calibration may be temperature dependent to correct for electronic offsets introduced by the changing temperature downhole. Temperature may be logged by a temperature sensor downhole. Furthermore, in some implementations additional processing may be applied to reduce noise. For example, data may be filtered to reduce noise and eliminate outliers.

After the results are produced, further post-processing steps may also be employed. Outputted imaging parameters may be constrained for the physicality of the results. For example, formation resistivity may be constrained between a predicted lower range of operation for the imager tool such as 0.01 Ω-m to an upper range such as 100000 Ω-m. Filtering approaches may be applied to outputs to reduce noise as well. Methods such as the application of histogram equalization and a smoothing filter may be used to improve the quality of the images if the data is being visualized.

Additionally, in examples artificial neural networks 900 may be replaced by other machine learning implementations with the same functionality. All these algorithms are trained using a training, validation, and testing dataset to obtain a regression function, and using this regression function to solve for output parameters. Some other examples of the machine learning algorithms include evolutionary algorithms, random forest method and support vector regression method.

In evolutionary algorithms, a large number of candidate regression functions are tested. These candidate functions may include polynomial, exponential, logarithmic and trigonometric expressions among others. Conditional statements and step functions may be tested as well. Initial candidate solutions are seeded randomly within the search space. At each iteration of the algorithm, which is called a generation in analogy with biology, properties of the candidate functions such as the coefficients of the functions or combinations of individual terms that make up the functions are mutated or crossed over. Mutation means a randomly created variation of a property while crossing over means replacing a property of a function with another or combining two or more functions while keeping some or all of the terms of each function. A subgroup of the candidate functions are selected based on a cost function at the end of an iteration. Value of the cost function determines the fitness of the function, again in analogy with the biological phenomenon. Final regression function may be selected when a predetermined fitness threshold is satisfied, or a maximum number of iterations or function evaluations have been performed.

In the random forest approach, regression models are created using a random subset of the training, validation, and testing dataset based on a decision tree approach. Then, these regression functions are combined by averaging them to create a final regression function for the dataset. Decision trees have nodes for each one of the input variables. Branches of the tree represent the possibility of an outcome while the leaves of the tree denote possible outputs. Lay out of the nodes is based on how well each node may classify the target output.

Support vector regression method is a subclass of the support vector machine technique that is used to find a regression function. It is based on minimizing a weight function whose inner product with the input (plus a constant offset) is an approximation of the output.

In the described examples, mud properties were assumed to be constant throughout a well. However, mud properties may change with temperature and pressure downhole. In such cases, mud properties may be estimated at multiple depths. In a basic approach, mud properties may be assumed to be constant in between depths where mud properties were assessed. A more complicated approach may involve interpolating/extrapolating mud properties with depth and using these interpolated values in obtaining the imaging properties.

In examples, instead of trying machine learning models for different mud candidates to obtain the lowest misfit, a machine learning model may be used to predict mud properties directly from the measurements (i.e. regression function with measurements as inputs and mud properties as outputs.) However, this method may require a very large training dataset to account for all the different mud and imaging properties or may run into accuracy problems.

Figure 12:
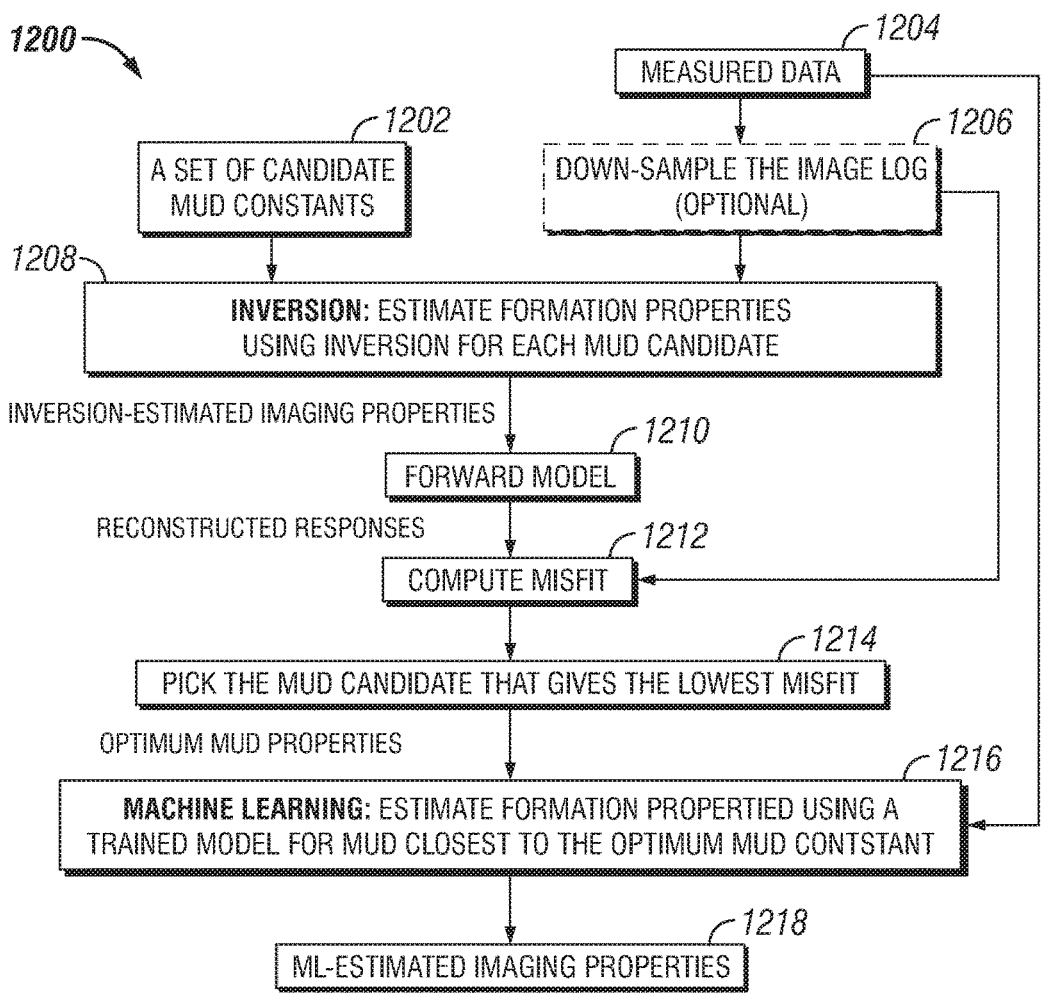
FIG. 12 is another example of a workflow in which imaging properties are determined by performing an inversion first and then performing machine learning.

FIG. 12 illustrates a third hybrid quantitative interpretation workflow 1200 which includes an inversion that is performed for different mud candidates. Workflow 1200 may begin with block 1202. In block 1202 a set of candidate mud constants is identified. The selection of mud candidates is similar to the methods describe in the first hybrid quantitative interpretation approach for workflow 800.

Block 1204 may be performed before, after, or during block 1202. In block 1204, downhole tool 102 (e.g., referring to FIG. 1) may perform one or more measurement operations and form an image log from the one or more measurements. In block 1206, a down-sample of the image log may be performed as an optional step. Similar to block 806 of the first hybrid quantitative interpretation approach.

In block 1208, selected mud candidates from block 1202 and measured data from block 1204 or optionally down-sampled date from block 1206, are input into one or more inversions. The inversion in block 1208 may return the parameter set that minimizes the cost function as given in Equation (13), discussed above. As discussed for block 808, measurement zones with high sensitivity to mud may be preferred as inputs for block 1208 and the same techniques described for block 808 may be used for their selection.

Once imaging properties are estimated for each mud candidate in block 1208, a forward model may be used to calculate the reconstructed tool responses in block 1210. These reconstructed tool responses are inputted into block 1212, where a misfit between the actual tool measurements and the reconstructed tool responses, that is the simulated tool measurements from the forward model, is calculated. Note that in a practical application, blocks 1210 and 1212 may be automatically performed implicitly as part of the inversion process (block 1208). These steps are separately shown in the workflow to highlight the analogy with the first hybrid quantitative interpretation approach as well as the possibility that different misfit functions may be used within the inversion and block 1212.

Once the misfit is calculated for each mud candidate in block 1212, the mud candidate with the lowest misfit value may be returned as the best representative of the actual mud in block 1214. Techniques described for block 814 for accurate determination of the mud candidate apply to block 1214 as well.

The selected mud candidate from block 1214 is input into block 1216. Block 1216 is a trained machine learning algorithm corresponding to this mud constant (or, if an exact match does not exist, closest to it) to obtain imaging parameters in fine scale. Closeness may be measured by Equation (14), discussed above in relation to block 1108.

In examples, a new machine learning model that exactly correspond to the inverted mud properties may be trained at this stage, similarly to methods discussed for block 1208. Imaging parameters returned by the machine learning are then returned in block 1216. In block 1218 these parameters may either be visualized as an image on a video display 120, and/or may be used as inputs for other algorithms on information handling system 114 (e.g., referring to FIG. 1).

Statement 1: A method for identifying one or more imaging properties may comprise identifying one or more candidate mud constants, taking one or more measurements from a borehole with a downhole tool to form an image log, inputting into a machine learning model one or more inputs such that the machine learning model outputs one or more estimated imaging properties, and wherein the one or more inputs comprise the one or more candidate mud constants and the one or more measurements. The method may further comprise inputting into a forward model at least the one or more estimated imaging properties and the one or more candidate mud constants such that the forward model outputs one or more reconstructed tool responses, computing a misfit between the one or more reconstructed tool responses and the one or more measurements, picking a mud candidate from the one or more candidate mud constants based at least in part on the misfit, and producing one or more imaging properties from the picked mud candidate.

Statement 2. The method of statement 1, wherein the imaging properties comprise one or more formation properties and a standoff distance, and wherein the one or more formation properties include one or more formation resistivities at one or more frequencies and one or more formation permittivities at the one or more frequencies.

Statement 3. The method of statement 1 or 2, further comprising performing an inversion for the one or more estimated imaging properties.

Statement 4. The method of statement 3, further comprising performing the inversion for the one or more estimated imaging properties if the misfit is above a predefined threshold.

Statement 5. The method of statements 3 or 4, wherein the inversion utilizes one or more inputs that include the one or more measurements and the one or more candidate mud constants.

Statement 6. The method of statements 3-5, wherein the inversion is performed by minimizing a cost function to solve for each of the one or more imaging properties.

Statement 7. The method of statements 1-3, wherein the machine learning model comprises one or more regression functions corresponding to each of the one or more candidate mud constants and wherein the regression functions are trained using one or more machine learning techniques.

Statement 8. The method of statement 7, wherein the one or more machine learning techniques may comprise an artificial neural network, a decision tree based method, evolutionary algorithms, or support vector regression methods.

Statement 9. The method of statements 7 or 8, wherein outputs from the one or more regression functions are fed to the forward model to produce one or more reconstructed tool responses and computing the misfit between the one or more reconstructed tool responses and the one or more measurements.

Statement 10. The method of statement 9, where the misfit is compared with a threshold and the outputs of the one or more regression functions are returned as one or more final imaging parameter outputs if the misfit is lower than the threshold.

Statement 11. The method of statements 1-3 or 7, further comprising displaying the one or more imaging properties with a video display.

Statement 12. The method of statements 1-3, 7, or 11, further comprising picking one or more candidate mud constants at one or more depth intervals and interpolating the one or more candidate mud constants at depth points wherein the one or more candidate mud constants are not evaluated.

Statement 13. The method of statements 1-3, 7, 11, or 12, wherein the machine learning model is a sequential machine learning solution that may comprise inputting the one or more measurements into a first machine learning model that produces one or more outputs of the one or more estimated imaging properties, and inputting the one or more outputs of the one or more estimated imaging properties along with the one or more measurements into a second machine learning model.

Statement 14. The method of statements 1-3, 7, or 11-13, wherein the forward model predicts a response of the downhole tool.

Statement 15. The method of statements 1-3, 7, or 11-14, wherein the misfit is calculated for a subset of the one or more candidate mud constants to identify a trend and if the trend is continuous, further calculation of the misfit for the remaining candidate mud constants is ceased.

Statement 16. The method of statements 1-3, 7, or 11-15, further comprising down sampling the image log.

Statement 17. A method for identifying one or more imaging properties may comprise taking one or more measurements from a borehole with a downhole tool to form an image log, inverting the image log to estimate one or more mud properties, and inputting into a machine learning model one or more inputs such that the machine learning model outputs one or more imaging properties, wherein the one or more inputs comprise the one or more mud properties and the one or more measurements.

Statement 18. The method of statement 17, wherein the machine learning model comprises one or more regression functions corresponding to the one or more mud properties and wherein the one or more regression functions are trained using one or more machine learning techniques.

Statement 19. The method of statement 18, where the one or more machine learning techniques may comprise an artificial neural network, a decision tree based method, evolutionary algorithms, or support vector regression methods.

Statement 20. The method of statement 18 or 19, wherein outputs of the one or more regression functions comprise one or more formation resistivities, one or more formation permittivities, and a standoff distance.

Statement 21. The method of statement 17 or 18, wherein the machine learning model is a sequential machine learning solution that may comprise inputting the one or more measurements into a first machine learning model that produces one or more outputs of the one or more estimated imaging properties and inputting the one or more outputs of the one or more estimated imaging properties along with the one or more measurements into a second machine learning model.

Statement 22. A method for identifying one or more imaging properties may comprise identifying one or more candidate mud constants, taking one or more measurements from a borehole with a downhole tool to form an image log, inverting the one or more measurements for each of the one or more candidate mud constants to produce one or more estimated imaging properties, and inputting into a forward model the one or more estimated imaging properties such that the forward model outputs one or more reconstructed tool responses. The method may further comprise computing a misfit between the one or more reconstructed tool responses and the one or more measurements, picking a mud candidate from the one or more candidate mud constants based at least in part of the misfit, selecting a machine learning model based on the picked mud candidate, inputting the one or more measurements into the selected machine learning model, and producing one or more imaging properties from the selected machine learning model.

Statement 23. The method of statement 22, wherein the machine learning model comprises one or more regression functions corresponding to the one or more candidate mud constants and wherein the regression functions are trained using one or more machine learning techniques.

Statement 24. The method of statement 23, where the one or more machine learning techniques may comprise an artificial neural network, a decision tree based method, evolutionary algorithms, or support vector regression methods.

Statement 25. The method of statement 22 or 23, wherein the machine learning model is a sequential machine learning solution that includes the steps of inputting the one or more measurements into a first machine learning model that produces one or more outputs of the one or more estimated imaging properties and inputting the one or more outputs of the one or more estimated imaging properties along with the one or more measurements into a second machine learning model.

Although the present disclosure and its advantages have been described in detail, it should be understood that various changes, substitutions and alterations may be made herein without departing from the spirit and scope of the disclosure as defined by the appended claims. The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for identifying one or more imaging properties comprising:
    identifying one or more candidate mud constants;
    taking one or more measurements from a borehole with a downhole tool to form an image log;
    inputting into a machine learning model one or more inputs such that the machine learning model outputs one or more estimated imaging properties, wherein the one or more inputs comprise the one or more candidate mud constants and the one or more measurements;
    inputting into a forward model at least the one or more estimated imaging properties and the one or more candidate mud constants such that the forward model outputs one or more reconstructed tool responses;
    computing a misfit between the one or more reconstructed tool responses and the one or more measurements;
    picking a mud candidate from the one or more candidate mud constants based at least in part on the misfit; and
    producing one or more imaging properties from the picked mud candidate.

2. The method of claim 1, wherein the imaging properties comprise one or more formation properties and a standoff distance, and wherein the one or more formation properties include one or more formation resistivities at one or more frequencies and one or more formation permittivities at the one or more frequencies.

3. The method of claim 1, further comprising performing an inversion for the one or more estimated imaging properties.

4. The method of claim 3, further comprising performing the inversion for the one or more estimated imaging properties if the misfit is above a predefined threshold.

5. The method of claim 3, wherein the inversion utilizes one or more inputs that include the one or more measurements and the one or more candidate mud constants.

6. The method of claim 3, wherein the inversion is performed by minimizing a cost function to solve for each of the one or more imaging properties.

7. The method of claim 1, wherein the machine learning model comprises one or more regression functions corresponding to each of the one or more candidate mud constants and wherein the regression functions are trained using one or more machine learning techniques.

8. The method of claim 7, wherein the one or more machine learning techniques may comprise an artificial neural network, a decision tree based method, evolutionary algorithms, or support vector regression methods.

9. The method of claim 7, wherein outputs from the one or more regression functions are fed to the forward model to produce one or more reconstructed tool responses and computing the misfit between the one or more reconstructed tool responses and the one or more measurements.

10. The method of claim 9, wherein the misfit is compared with a threshold and the outputs of the one or more regression functions are returned as one or more final imaging parameter outputs if the misfit is lower than the threshold.

11. The method of claim 1, further comprising displaying the one or more imaging properties with a video display.

12. The method of claim 1, further comprising picking one or more candidate mud constants at one or more depth intervals and interpolating the one or more candidate mud constants at depth points wherein the one or more candidate mud constants are not evaluated.

13. The method of claim 1, wherein the machine learning model is a sequential machine learning solution that comprises:
    inputting the one or more measurements into a first machine learning model that produces one or more outputs of the one or more estimated imaging properties; and inputting the one or more outputs of the one or more estimated imaging properties along with the one or more measurements into a second machine learning model.

14. The method of claim 1, wherein the forward model predicts a response of the downhole tool.

15. The method of claim 1, wherein the misfit is calculated for a subset of the one or more candidate mud constants to identify a trend and if the trend is continuous, further calculation of the misfit for the remaining candidate mud constants is ceased.

16. The method of claim 1, further comprising down sampling the image log.

17. A method for identifying one or more imaging properties comprising:
taking one or more measurements from a borehole with a downhole tool to form an image log;
inverting the image log to estimate one or more mud properties; and
inputting into a machine learning model one or more inputs such that the machine learning model outputs one or more imaging properties, wherein the one or more inputs comprise the one or more mud properties and the one or more measurements.

18. The method of claim 17, wherein the machine learning model comprises one or more regression functions corresponding to the one or more mud properties and wherein the one or more regression functions are trained using one or more machine learning techniques.

19. The method of claim 18, wherein the one or more machine learning techniques may comprise an artificial neural network, a decision tree based method, evolutionary algorithms, or support vector regression methods.

20. The method of claim 18, wherein outputs of the one or more regression functions comprise one or more formation resistivities, one or more formation permittivities, and a standoff distance.

21. The method of claim 17, wherein the machine learning model is a sequential machine learning solution that comprises:
inputting the one or more measurements into a first machine learning model that produces one or more outputs of the one or more estimated imaging properties; and
inputting the one or more outputs of the one or more estimated imaging properties along with the one or more measurements into a second machine learning model.

22. A method for identifying one or more imaging properties comprising:
identifying one or more candidate mud constants;
taking one or more measurements from a borehole with a downhole tool to form an image log;
inverting the one or more measurements for each of the one or more candidate mud constants to produce one or more estimated imaging properties;
inputting into a forward model the one or more estimated imaging properties such that the forward model outputs one or more reconstructed tool responses;
computing a misfit between the one or more reconstructed tool responses and the one or more measurements;
picking a mud candidate from the one or more candidate mud constants based at least in part of the misfit;
selecting a machine learning model based on the picked mud candidate;
inputting the one or more measurements into the selected machine learning model; and
producing one or more imaging properties from the selected machine learning model.

23. The method of claim 22, wherein the machine learning model comprises one or more regression functions corresponding to the one or more candidate mud constants and wherein the regression functions are trained using one or more machine learning techniques.

24. The method of claim 23, wherein the one or more machine learning techniques may comprise an artificial neural network, a decision tree based method, evolutionary algorithms, or support vector regression methods.

25. The method of claim 22, wherein the machine learning model is a sequential machine learning solution that includes the steps of:
inputting the one or more measurements into a first machine learning model that produces one or more outputs of the one or more estimated imaging properties; and
inputting the one or more outputs of the one or more estimated imaging properties along with the one or more measurements into a second machine learning model.

* * * * *